United States Patent
Xie et al.

(10) Patent No.: US 12,356,232 B2
(45) Date of Patent: Jul. 8, 2025

(54) MEASUREMENT METHOD AND APPARATUS FOR ENTERING A RELAXED MEASUREMENT STATE OF A SERVING CELL

(71) Applicant: Huawei Technologies Co., Ltd., Shenzhen (CN)

(72) Inventors: Zonghui Xie, Shenzhen (CN); Lei Chen, Beijing (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 17/884,314

(22) Filed: Aug. 9, 2022

(65) Prior Publication Data
US 2022/0386161 A1 Dec. 1, 2022

Related U.S. Application Data

(63) Continuation of application No. PCT/CN2020/074939, filed on Feb. 12, 2020.

(51) Int. Cl.
*H04W 24/10* (2009.01)
*H04W 36/00* (2009.01)

(52) U.S. Cl.
CPC ....... *H04W 24/10* (2013.01); *H04W 36/0088* (2013.01)

(58) Field of Classification Search
CPC . H04W 24/10; H04W 36/0088; H04W 48/16; H04W 48/20; H04W 52/0235; Y02D 30/70
See application file for complete search history.

(56) References Cited

U.S. PATENT DOCUMENTS

2016/0007237 A1* 1/2016 Jung ............... H04W 72/04
455/438
2019/0223073 A1 7/2019 Chen et al.
(Continued)

FOREIGN PATENT DOCUMENTS

CN 103108333 A 5/2013
EP 3952418 A1 2/2022
(Continued)

OTHER PUBLICATIONS

"Consideration on NR RRM for UE power saving," 3GPP TSG RAN WG1 Meeting #96, R1-1902731, Athens Greece, Spreadtrum Communications, Total 11 pages, 3rd Generation Partnership Project, Valbonne, France (Feb. 25-Mar. 1, 2019).
(Continued)

*Primary Examiner* — Tejis Daya
(74) *Attorney, Agent, or Firm* — Leydig, Voit & Mayer, Ltd.

(57) ABSTRACT

This application relates to a measurement method and an apparatus. If determining that a terminal device meets a first measurement reporting condition, the terminal device sends first information to a network device. After receiving the first information, the network device sends second information to the terminal device, and the terminal device receives the second information from the network device, where the second information indicates to enter a relaxed measurement state of a serving cell. For such a terminal device, frequent measurement of the serving cell is equivalent to an unnecessary measurement process, and causes high power consumption. Therefore, the network device may indicate such a terminal device to enter the relaxed measurement state of the serving cell.

14 Claims, 11 Drawing Sheets

(56) References Cited

U.S. PATENT DOCUMENTS

| | | | |
|---|---|---|---|
| 2020/0314868 A1* | 10/2020 | Tseng | H04W 8/08 |
| 2022/0116802 A1* | 4/2022 | Kim | H04W 76/27 |
| 2022/0167370 A1* | 5/2022 | Chen | H04W 72/542 |
| 2023/0078923 A1* | 3/2023 | Shi | H04W 52/0258 370/311 |
| 2023/0276321 A1* | 8/2023 | Da Silva | H04W 36/0088 370/252 |

FOREIGN PATENT DOCUMENTS

| | | |
|---|---|---|
| EP | 4087307 A1 | 11/2022 |
| WO | 2021064281 A1 | 4/2021 |

OTHER PUBLICATIONS

Ericsson, "Relaxed monitoring criterion in Idle and Inactive mode," 3GPP TSG-RAN2 Meeting #106, Reno, USA, R2-1906612, Total 4 pages, 3rd Generation Partnership Project, Valbonne, France (May 13-17, 2019).

Huawei et al., "Criteria and solutions for RRM relaxation of serving cell measurements," 3GPP TSG-RAN WG2 Meeting 106, Reno, Nevada, USA, R2-1906910, Total 3 pages, 3rd Generation Partnership Project, Valbonne, France (May 13-17, 2019).

"Criteria of serving cell measurement relaxation for WUS-capable UE," 3GPP TSG-RAN WG4 Meeting #87, Busan, Korea, R4-1807329, pp. 1-3, 3rd Generation Partnership Project, Valbonne, France (May 21-25, 2018).

"Serving cell RRM relaxation for WUS-capable UE," 3GPP TSG-RAN WG4 #86, Athens, Greece, R4-1801960, pp. 1-4, 3rd Generation Partnership Project, Valbonne, France (Feb. 26-Mar. 2, 2018).

"RRM measurement relaxation criteria," 3GPP TSG-RAN WG2 Meeting #107bis, Chongqing, China, R2-1912334, Total 5 pages, 3rd Generation Partnership Project, Valbonne, France (Oct. 14-18, 2019).

LG Electronics, "Discussion on UE power consumption reduction in RRM measurements," 3GPP TSG RAN WG1 #96, Athens, Greece, R1-1902054, total 3 pages, 3rd Generation Partnership Project, Valbonne, France (Feb. 25-Mar. 1, 2019).

* cited by examiner

MEASUREMENT METHOD AND APPARATUS FOR ENTERING A RELAXED MEASUREMENT STATE OF A SERVING CELL

CROSS-REFERENCE TO RELATED APPLICATIONS

This application is a continuation of International Application No. PCT/CN2020/074939, filed on Feb. 12, 2020, the disclosure of which is hereby incorporated by reference in its entirety.

TECHNICAL FIELD

This application relates to the field of mobile communication technologies, and in particular, to a measurement method and an apparatus.

BACKGROUND

Mobility management is an important part in wireless mobile communication. Mobility management is a general term of related operations used to ensure that interruption of a communication link between a network and a terminal device is not caused by movement of the terminal device. Based on a status of the terminal device, mobility management may be roughly classified into two parts: mobility management in a radio resource control (RRC) idle state (RRC idle state) and mobility management in an RRC connected state (RRC connected state). The mobility management in an RRC idle state mainly refers to a cell selection/reselection process. The mobility management in an RRC connected state mainly refers to a cell handover process. Both cell selection/reselection and cell handover are performed based on a measurement result of the terminal device. Therefore, measurement by the terminal device is a basis of mobility management.

Measurement by the terminal device includes measurement of a serving cell of the terminal device, and further includes measurement of a neighboring cell of the serving cell, for example, measurement of a neighboring cell that belongs to a same communication system as the serving cell, or measurement of an inter-RAT neighboring cell of the serving cell. Currently, a process in which a terminal device measures a serving cell is always performed, and measurement of a neighboring cell is performed only when a specific condition is met. In addition, a relaxed measurement condition of a neighboring cell is further set for measurement of the neighboring cell. If the relaxed measurement condition of the neighboring cell is met, the terminal device may not perform measurement of the neighboring cell. In these manners, power consumption of the terminal device caused by measurement can be reduced.

For some terminal devices, for example, a terminal device in a static state, a terminal device with a low moving speed, or a terminal device in a cell center, a probability of performing cell reselection or cell handover is low. However, the process in which a terminal device measures a serving cell is always performed. Such a terminal device continuously measures the serving cell, but utilization of a measurement result is not high. Therefore, it may be considered that the measurement process is unnecessary and causes high power consumption of the terminal device.

SUMMARY

Embodiments of this application provide a measurement method and an apparatus, to reduce power consumption of a terminal device.

According to a first aspect, a first measurement method is provided. The method includes: determining that a first measurement reporting condition is met; sending first information to a network device; and receiving second information from the network device, where the second information is used to indicate to enter a relaxed measurement state of a serving cell.

The method may be performed by a first communication apparatus. The first communication apparatus may be a communication device, or may be a communication apparatus, for example, a chip, that can support the communication device in implementing a function required in the method. For example, the first communication apparatus is a terminal device, a chip that is disposed in the terminal device and that is configured to implement a function of the terminal device, or another component that is configured to implement the function of the terminal device. In the following description process, an example in which the first communication apparatus is a terminal device is used.

In embodiments of this application, the terminal device may determine whether the first measurement reporting condition is met. If the first measurement reporting condition is met, it indicates that there is a low probability that the terminal device performs cell handover or reselection. For example, the terminal device may be located in a center of the serving cell, may have low mobility, or may have a small activity scope. For such a terminal device, frequent measurement of the serving cell is equivalent to an unnecessary measurement process, and causes high power consumption. Therefore, the network device may indicate such a terminal device to enter the relaxed measurement state of the serving cell, to reduce a measurement process of the serving cell, so as to save power.

In an optional implementation, the first measurement reporting condition includes that signal quality of the serving cell (or a measurement result obtained by measuring the serving cell, or received signal strength of the serving cell for the terminal device) meets a first threshold within first duration.

For example, that a measurement result of the serving cell meets a first threshold may include: a measurement result (where the measurement result may also be referred to as a measurement value) obtained by the terminal device by measuring the serving cell within fourth duration meets the first threshold. For example, that a measurement result obtained by the terminal device by measuring the serving cell within fourth duration meets the first threshold may mean that N measurement results obtained by the terminal device by measuring the serving cell within the fourth duration meet the first threshold, and the N measurement results may be all or a part of measurement results obtained by the terminal device within the fourth duration. Alternatively, there may be no concept of fourth duration, and that signal quality of the serving cell meets a first threshold may include: N measurement results (or referred to as measurement values) obtained by the terminal device by measuring the serving cell meet the first threshold. In this case, the N measurement results may be understood as a set of N measurement results. N may be an integer greater than or equal to 1.

If N is greater than 1, the N measurement results may be N measurement results corresponding to N times of continuous measurement, or the N times of measurement corresponding to the N measurement results may not be continuously performed. If N is greater than 1, in an example, that a measurement result obtained by the terminal device by measuring the serving cell within fourth duration meets the first threshold may include Implementation 1. For example, in Implementation 1, a difference (a variance, or the like) between every K adjacent measurement values of the N measurement values is less than or equal to a first sub-threshold. Alternatively, for example, in Implementation 1, a sum (or a difference) of a difference (a variance, or the like) between every K adjacent measurement values and a first hysteresis parameter is less than or equal to a first sub-threshold. Alternatively, for example, in Implementation 1, a difference (a variance, or the like) between any K measurement values of the N measurement values is less than or equal to a first sub-threshold. Alternatively, for example, in Implementation 1, a sum (or a difference) of a difference (a variance, or the like) between any K measurement values of the N measurement values and a first hysteresis parameter is less than or equal to a first sub-threshold. In Implementation 1, the first threshold may be the first sub-threshold, and that a parameter meets the first threshold means that a value of the parameter is less than or equal to the first threshold. K is an integer greater than or equal to 2, and K is less than or equal to N. For another example, that a measurement result obtained by the terminal device by measuring the serving cell within fourth duration meets the first threshold may include Implementation 2. For example, in Implementation 2, the N measurement values and a first reference value (or may be referred to as a second hysteresis parameter) meet the first threshold. In this case, N may be equal to 1 or may be greater than 1. For example, Implementation 2 may be implemented as follows: a difference (or a variance of all differences) between each of the N measurement values and the first reference value is greater than or equal to a second sub-threshold. Alternatively, a difference (or a variance of all differences) between each of the N measurement values and the first reference value is greater than or equal to a second sub-threshold. In Implementation 2, the first threshold may be the second sub-threshold, and that a parameter meets the first threshold means that a value of the parameter is greater than or equal to the first threshold. That a measurement result obtained by the terminal device by measuring the serving cell within fourth duration meets the first threshold may include Implementation 1, may include Implementation 2, or may include Implementation 1 and Implementation 2.

In an optional implementation, the method further includes:
  determining that a second measurement reporting condition is met;
  sending third information to the network device; and
  receiving fourth information from the network device, where the fourth information is used to indicate to enter a normal measurement state of the serving cell.

After entering the relaxed measurement state of the serving cell, the terminal device may further determine whether the second measurement reporting condition is met. If the second measurement reporting condition is met, it indicates that there is a high probability that the terminal device performs cell handover or reselection. For example, the terminal device may be located at an edge of the serving cell, may have high mobility, or may have a large activity scope. For such a terminal device, if measurement of the serving cell is excessively sparse, the terminal device may miss a cell reselection occasion or a cell handover occasion. Therefore, the network device may indicate such a terminal device to enter the normal measurement state of the serving cell, to add a process of measuring the serving cell, so as to perform cell reselection or cell handover in a timely manner.

In an optional implementation, the second measurement reporting condition includes that the signal quality of the serving cell (or the measurement result obtained by measuring the serving cell, or the received signal strength of the serving cell for the terminal device) meets a second threshold within second duration.

For example, that the measurement result of the serving cell meets a second threshold may include: a measurement result (where if the measurement result is reference signal received power (RSRP), reference signal received quality (RSRQ), a signal to interference plus noise ratio (SINR), or the like, the measurement result may also be referred to as a measurement value) obtained by the terminal device by measuring the serving cell within fifth duration meets the second threshold. For example, that a measurement result obtained by the terminal device by measuring the serving cell within fifth duration meets the second threshold may mean that N measurement results obtained by the terminal device by measuring the serving cell within the fifth duration meet the second threshold, and the N measurement results may be all or a part of measurement results obtained by the terminal device within the fifth duration. Alternatively, there may be no concept of fifth duration, and that the signal quality of the serving cell meets a second threshold may include: N measurement results (or referred to as measurement values) obtained by the terminal device by measuring the serving cell meet the second threshold. In this case, the N measurement results may be understood as a set of N measurement results. N may be an integer greater than or equal to 1.

If N is greater than 1, the N measurement results may be N measurement results corresponding to N times of continuous measurement, or the N times of measurement corresponding to the N measurement results may not be continuously performed. If N is greater than 1, in an example, that a measurement result obtained by the terminal device by measuring the serving cell within fifth duration meets the second threshold may include Implementation 3. For example, in Implementation 3, a difference (a variance, or the like) between every K adjacent measurement values of the N measurement values is greater than or equal to a third sub-threshold. Alternatively, for example, in Implementation 3, a sum (or a difference) of a difference (a variance, or the like) between every K adjacent measurement values and a third hysteresis parameter is greater than or equal to a third sub-threshold. Alternatively, for example, in Implementation 3, a difference (a variance, or the like) between any K measurement values of the N measurement values is greater than or equal to a third sub-threshold. Alternatively, for example, in Implementation 3, a sum (or a difference) of a difference (a variance, or the like) between any K measurement values of the N measurement values and a third hysteresis parameter is greater than or equal to a third sub-threshold. In Implementation 3, the second threshold is the third sub-threshold, and that a parameter meets the second threshold means that a value of the parameter is greater than or equal to the second threshold. K is an integer greater than or equal to 2, and K is less than or equal to N. For another example, that a measurement result obtained by the terminal device by measuring the serving cell within fifth duration meets the second threshold may include Implementation 4. For example, in Implementation 4, the N measurement values and a second reference value (or may be referred to as a fourth hysteresis parameter) meet the second threshold. In this case, N may be equal to 1 or may be greater than 1. Implementation 4 may be implemented as follows: a difference (or a variance of all differences) between each of the N measurement values and the second reference value is less than or equal to a fourth sub-threshold. Alternatively, a difference (or a variance of all differences) between each of the N measurement values and the second reference value is less than or equal to a fourth sub-threshold. In Implementation 4, the second threshold is the fourth sub-threshold, and that a parameter meets the second threshold means that a value of the parameter is less than or equal to the second threshold. That a measurement result obtained by the terminal device by measuring the serving cell within fifth duration meets the second threshold may include Implementation 3, may include Implementation 4, or may include Implementation 3 and Implementation 4.

In an optional implementation, the method further includes:

determining to enter a normal measurement state of the serving cell after third duration.

After entering the relaxed measurement state of the serving cell, the terminal device may determine, by determining whether the second measurement reporting condition is met, whether to exit from the relaxed measurement state of the serving cell. Alternatively, the terminal device may not need to determine the second measurement reporting condition. Instead, after staying in the relaxed measurement state of the serving cell for the third duration, the terminal device may re-enter the normal measurement state of the serving cell to normally measure the serving cell, so that a probability of missing a cell reselection opportunity is reduced. In this manner, the terminal device can resume normal measurement of the serving cell without an indication of the network device. This helps reduce signaling overheads.

In an optional implementation, the second information is further used to indicate the third duration.

The third duration may be configured by the network device for the terminal device. For example, the network device may indicate the third duration based on third information. Alternatively, the third duration may be determined by the terminal device. Alternatively, the third duration may be specified in a protocol.

According to a second aspect, a second measurement method is provided. The method includes: receiving first information from a terminal device; and sending second information to the terminal device, where the second information is used to indicate to enter a relaxed measurement state of a serving cell.

The method may be performed by a second communication apparatus. The second communication apparatus may be a communication device, or may be a communication apparatus, for example, a chip, that can support the communication device in implementing a function required in the method. For example, the second communication apparatus is a network device, a chip that is disposed in the network device and that is configured to implement a function of the network device, or another component that is configured to implement the function of the network device. In the following description process, an example in which the second communication apparatus is a network device is used.

In an optional implementation, the method further includes:

receiving third information from the terminal device; and
sending fourth information to the terminal device, where the fourth information is used to indicate to enter a normal measurement state of the serving cell.

In an optional implementation, the second information is further used to indicate third duration, and usage of the third duration is that the terminal device enters a normal measurement state of the serving cell after the third duration.

For technical effects brought by the second aspect or the optional implementations, refer to the descriptions of the technical effects brought by the first aspect or the corresponding implementations.

According to a third aspect, a third measurement method is provided. The method includes: determining that a third communication apparatus is in a relaxed measurement state of a serving cell; and determining, based on a first configuration parameter, that a relaxed measurement condition of a neighboring cell is met, where the first configuration parameter is different from a second configuration parameter, and the second configuration parameter is used to determine the relaxed measurement condition of the neighboring cell when the third communication apparatus is in a normal measurement state of the serving cell.

The method may be performed by the third communication apparatus. The third communication apparatus may be a communication device, or may be a communication apparatus, for example, a chip, that can support the communication device in implementing a function required in the method. For example, the third communication apparatus is a terminal device, a chip that is disposed in the terminal device and that is configured to implement a function of the terminal device, or another component that is configured to implement the function of the terminal device. In the following description process, an example in which the third communication apparatus is a terminal device is used.

In embodiments of this application, the relaxed measurement state of the serving cell is set. In the relaxed measurement state of the serving cell, frequency of measurement of the serving cell performed by the terminal device is low, or a quantity of times of measurement of the serving cell performed by the terminal device is small. In this way, power consumption of the terminal device can be reduced.

In addition, when the terminal device is in the relaxed measurement state of the serving cell, the terminal device may also enter a relaxed measurement state of the neighboring cell, and frequency of measurement of the neighboring cell performed by the terminal device may also be correspondingly reduced. When the terminal device is in the relaxed measurement state of the neighboring cell, the terminal device may continue to determine whether to stay in the relaxed measurement state of the neighboring cell. If the relaxed measurement condition of the neighboring cell is not met, the terminal device exits from the relaxed measurement state of the neighboring cell, and performs normal measurement of the neighboring cell. If the relaxed measurement condition of the neighboring cell is met, the terminal device continues to stay in the relaxed measurement state of the neighboring cell. If the terminal device cannot exit from the relaxed measurement state of the neighboring cell, the terminal device cannot normally measure the neighboring cell. Consequently, the terminal device may miss an occasion for performing cell reselection. Therefore, in embodiments of this application, two sets of parameters, namely, the first configuration parameter and the second configuration parameter, may be configured for the terminal device. The first configuration parameter is used by the terminal device in the relaxed measurement state of the serving cell to determine whether the relaxed measurement condition of the neighboring cell is met. The second configuration parameter is used by the terminal device in the normal measurement state of the serving cell to determine whether the relaxed measurement condition of the neighboring cell is met. The terminal device in the relaxed measurement state of the serving cell and the relaxed measurement state of the neighboring cell can exit, based on the first configuration parameter, from the relaxed measurement state of the neighboring cell as easily as possible. This ensures measurement of the neighboring cell, so that the terminal device can perform reselection to an appropriate cell in a timely manner.

In an optional implementation, the determining, by using a first configuration parameter, whether a relaxed measurement condition of a neighboring cell is met includes: when the following conditions are met, determining that the relaxed measurement condition of the neighboring cell is met:
  a relaxed monitoring criterion is met within first duration;
  less than fourth duration has passed since measurement for cell reselection is last performed; and
  measurement of the neighboring cell has been performed within at least the first duration after a new cell is selected or reselected, where
  the first configuration parameter includes information about the first duration.

That a relaxed monitoring criterion is met within first duration may be understood as follows: all measurement results obtained within the first duration meet the relaxed monitoring criterion. That less than fourth duration has passed since measurement for cell reselection is last performed may be understood as follows: duration between current time and time when measurement for cell reselection is performed last time is less than the fourth duration. The fourth duration is, for example, 24 hours, or may be other duration. That measurement of the neighboring cell has been performed within at least the first duration after a new cell is selected or reselected may be understood as follows: measurement of the neighboring cell has been performed within at least the first duration after the new cell is accessed through cell reselection or cell selection. A manner of determining the relaxed measurement condition of the neighboring cell is provided herein. In addition, another manner of determining the relaxed measurement condition of the neighboring cell also falls within the protection scope of embodiments of this application.

In an optional implementation, the first configuration parameter includes a first threshold, and the first threshold, a reference value, and current quality of the serving cell are used to determine that the relaxed monitoring criterion is met.

For example, if a difference between the current quality of the serving cell and the reference value is less than the first threshold, it indicates that the relaxed monitoring criterion is met; otherwise, it indicates that the relaxed monitoring criterion is not met.

In an optional implementation, the method further includes:
  measuring the serving cell, and determining a measurement result;
  determining a measurement periodicity corresponding to the measurement result; and
  measuring the serving cell based on the measurement periodicity.

For example, a correspondence between a measurement result and a measurement periodicity may be established in advance. For example, a correspondence between RSRP and a measurement periodicity is established in advance, a correspondence between RSRQ and a measurement periodicity is established in advance, or a correspondence between an SINR and a measurement periodicity is established in advance. The correspondence may be established by a network device, and the network device may send the correspondence to the terminal device. Alternatively, the correspondence may be established by the terminal device, and the terminal device may send the correspondence to the network device after establishing the correspondence. Alternatively, the correspondence may be preconfigured in the terminal device, specified in a protocol, or the like. After determining the corresponding measurement periodicity based on the correspondence between a measurement result and a measurement periodicity and the obtained measurement result, the terminal device may measure the serving cell of the terminal device based on the measurement periodicity. The measurement periodicity is determined based on the measurement result of the terminal device, and conforms to a current state of the terminal device, so that measurement of the serving cell performed by the terminal device can meet a requirement of the terminal device, and energy saving can be implemented as much as possible.

In an optional implementation,
  better signal quality of the serving cell indicates a longer length of the corresponding measurement periodicity, or poorer signal quality of the serving cell indicates a shorter length of the corresponding measurement periodicity, where the measurement result is used to indicate the signal quality of the serving cell; and/or
  better received signal strength of the serving cell indicates a longer length of the corresponding measurement periodicity, or poorer received signal strength of the serving cell indicates a shorter length of the corresponding measurement periodicity, where the measurement result is used to indicate the received signal strength of the serving cell.

The received signal strength of the serving cell is, for example, received signal strength of the serving cell for the terminal device. For example, a larger value of the measurement result indicates a longer length of the corresponding measurement periodicity, or a smaller value of the measurement result indicates a shorter length of the corresponding measurement periodicity. The measurement result may be used to represent the signal quality of the serving cell. For example, better signal quality of the serving cell indicates a larger value of the measurement result, or poorer signal quality of the serving cell indicates a smaller value of the measurement result. Therefore, it may also be considered that better signal quality of the serving cell indicates a longer length of the corresponding measurement periodicity, or poorer signal quality of the serving cell indicates a shorter length of the corresponding measurement periodicity. Alternatively, the measurement result may be used to represent the received signal strength of the serving cell. For example, better received signal strength of the serving cell indicates a larger value of the measurement result, or poorer received signal strength of the serving cell indicates a smaller value of the measurement result. Therefore, it may also be considered that better received signal strength of the serving cell indicates a longer length of the corresponding measurement periodicity, or poorer received signal strength of the serving cell indicates a shorter length of the corresponding measurement periodicity.

According to a fourth aspect, a fourth measurement method is provided. The method includes: determining a first configuration parameter and a second configuration parameter, where the first configuration parameter is used to determine a relaxed measurement condition of a neighboring cell when a fourth communication apparatus is in a relaxed measurement state of a serving cell, the second configuration parameter is used to determine the relaxed measurement condition of the neighboring cell when the fourth communication apparatus is in a normal measurement state of the serving cell, and the first configuration parameter is different from the second configuration parameter; and sending the first configuration parameter and the second configuration parameter to a terminal device.

The method may be performed by the fourth communication apparatus. The fourth communication apparatus may be a communication device, or may be a communication apparatus, for example, a chip, that can support the communication device in implementing a function required in the method. For example, the fourth communication apparatus is a network device, a chip that is disposed in the network device and that is configured to implement a function of the network device, or another component that is configured to implement the function of the network device. In the following description process, an example in which the fourth communication apparatus is a network device is used.

For technical effects brought by some optional implementations of the fourth aspect, refer to the descriptions of the technical effects brought by the third aspect or the corresponding implementations.

According to a fifth aspect, a fifth communication method is provided. The method includes: measuring a serving cell, and determining a measurement result; determining a measurement periodicity corresponding to the measurement result; and measuring the serving cell based on the measurement periodicity.

The method may be performed by a fifth communication apparatus. The fifth communication apparatus may be a communication device, or may be a communication apparatus, for example, a chip, that can support the communication device in implementing a function required in the method. For example, the fifth communication apparatus is a terminal device, a chip that is disposed in the terminal device and that is configured to implement a function of the terminal device, or another component that is configured to implement the function of the terminal device. In the following description process, an example in which the fifth communication apparatus is a terminal device is used.

In embodiments of this application, a correspondence between a measurement result and a measurement periodicity is set. The terminal device may determine the corresponding measurement periodicity based on the measurement result, to measure the serving cell based on the determined measurement periodicity. For example, the measurement result is RSRP, and a larger value of the RSRP may indicate that the terminal device moves toward a center location of the serving cell. In this case, a probability that the terminal device performs cell reselection or handover is low, and therefore the terminal device does not need to excessively measure the serving cell. In this case, a length of the measurement periodicity may gradually increase, so that the terminal device sparsely measures the serving cell, thereby reducing power consumption of the terminal device. A smaller value of the RSRP may indicate that the terminal device moves toward an edge location of the serving cell. In this case, a probability that the terminal device performs cell reselection or handover is high, and the terminal device needs to measure the serving cell. Therefore, a length of the measurement periodicity may gradually decrease, so that the terminal device tends to frequently measure the serving cell, thereby meeting mobility management of the terminal device.

In an optional implementation, better signal quality of the serving cell indicates a longer length of the corresponding measurement periodicity, or poorer signal quality of the serving cell indicates a shorter length of the corresponding measurement periodicity, where the measurement result is used to indicate the signal quality of the serving cell; and/or better received signal strength of the serving cell indicates a longer length of the corresponding measurement periodicity, or poorer received signal strength of the serving cell indicates a shorter length of the corresponding measurement periodicity, where the measurement result is used to indicate the received signal strength of the serving cell.

For example, a larger value of the measurement result indicates a longer length of the corresponding measurement periodicity, or a smaller value of the measurement result indicates a shorter length of the corresponding measurement periodicity. The measurement result may be used to represent the signal quality of the serving cell. For example, better signal quality of the serving cell indicates a larger value of the measurement result, or poorer signal quality of the serving cell indicates a smaller value of the measurement result. Therefore, it may also be considered that better signal quality of the serving cell indicates a longer length of the corresponding measurement periodicity, or poorer signal quality of the serving cell indicates a shorter length of the corresponding measurement periodicity. Alternatively, the measurement result may be used to represent the received signal strength of the serving cell. For example, better received signal strength of the serving cell indicates a larger value of the measurement result, or poorer received signal strength of the serving cell indicates a smaller value of the measurement result. Therefore, it may also be considered that better received signal strength of the serving cell indicates a longer length of the corresponding measurement periodicity, or poorer received signal strength of the serving cell indicates a shorter length of the corresponding measurement periodicity.

According to a sixth aspect, a communication apparatus is provided. The communication apparatus is, for example, the first communication apparatus described above. The first communication apparatus is configured to perform the method according to any one of the first aspect or the possible implementations. Specifically, the first communication apparatus may include modules configured to perform the method according to any one of the first aspect or the possible implementations, for example, include a processing module and a transceiver module. For example, the transceiver module may include a sending module and a receiving module. The sending module and the receiving module may be different functional modules, or may be a same functional module but can implement different functions. For example, the first communication apparatus is a communication device, or is a chip or another component disposed in the communication device. For example, the communication device is a network device. An example in which the first communication apparatus is a terminal device is used below. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the first communication apparatus is a communication device, the transceiver is implemented, for example, by an antenna, a feeder, and a codec in the communication device. Alternatively, if the first communication apparatus is a chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the sixth aspect, an example in which the first communication apparatus is a terminal device and includes the processing module and the transceiver module is still used for description.

The processing module is configured to determine that a first measurement reporting condition is met.

The transceiver module is configured to send first information to a network device, where
    the transceiver module is further configured to receive second information from the network device, where the second information is used to indicate to enter a relaxed measurement state of a serving cell.

In an optional implementation, the first measurement reporting condition includes that signal quality of the serving cell meets a first threshold within first duration.

In an optional implementation,
    the processing module is further configured to determine that a second measurement reporting condition is met;
    the transceiver module is further configured to send third information to the network device; and
    the transceiver module is further configured to receive fourth information from the network device, where the fourth information is used to indicate to enter a normal measurement state of the serving cell.

In an optional implementation, the second measurement reporting condition includes that the signal quality of the serving cell meets a second threshold within second duration.

In an optional implementation, the processing module is further configured to determine to enter a normal measurement state of the serving cell after third duration.

In an optional implementation, the second information is further used to indicate the third duration.

For technical effects brought by the sixth aspect or the optional implementations, refer to descriptions of the technical effects brought by the first aspect or the corresponding implementations.

According to a seventh aspect, a communication apparatus is provided. The communication apparatus is, for example, the second communication apparatus described above. The second communication apparatus is configured to perform the method according to any one of the second aspect or the possible implementations. Specifically, the second communication apparatus may include modules configured to perform the method according to any one of the second aspect or the possible implementations, for example, include a processing module and a transceiver module. For example, the transceiver module may include a sending module and a receiving module. The sending module and the receiving module may be different functional modules, or may be a same functional module but can implement different functions. For example, the second communication apparatus is a communication device or a chip or another component disposed in the communication device. For example, the communication device is a network device. An example in which the second communication apparatus is a network device is used below. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the second communication apparatus is a communication device, the transceiver is implemented, for example, by an antenna, a feeder, and a codec in the communication device. Alternatively, if the second communication apparatus is a chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the seventh aspect, an example in which the second communication apparatus is a terminal device and includes the processing module and the transceiver module is still used for description.

The transceiver module is configured to receive first information from a terminal device; and
    the transceiver module is further configured to send second information to the terminal device, where the second information is used to indicate to enter a relaxed measurement state of a serving cell.

Alternatively,
    the transceiver module is configured to receive first information from a terminal device; and
    the processing module is configured to determine, based on the first information, that the terminal device can enter a relaxed measurement state of a serving cell, where
    the transceiver module is further configured to send second information to the terminal device, where the second information is used to indicate to enter the relaxed measurement state of the serving cell.

In an optional implementation, the transceiver module is further configured to:
    receive third information from the terminal device; and
    send fourth information to the terminal device, where the fourth information is used to indicate to enter a normal measurement state of the serving cell.

In an optional implementation, the second information is further used to indicate third duration, and usage of the third duration is that the terminal device enters a normal measurement state of the serving cell after the third duration.

For technical effects brought by the seventh aspect or the optional implementations, refer to descriptions of the technical effects brought by the second aspect or the corresponding implementations.

According to an eighth aspect, a communication apparatus is provided. The communication apparatus is, for example, the third communication apparatus described above. The third communication apparatus is configured to perform the method according to any one of the third aspect or the possible implementations. Specifically, the third communication apparatus may include modules configured to perform the method according to any one of the third aspect or the possible implementations, for example, include a processing module and a transceiver module. For example, the transceiver module may include a sending module and a receiving module. The sending module and the receiving module may be different functional modules, or may be a same functional module but can implement different functions. For example, the third communication apparatus is a communication device, or is a chip or another component disposed in the communication device. For example, the communication device is a terminal device. An example in which the third communication apparatus is a terminal device is used below. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the third communication apparatus is a communication device, the transceiver is implemented, for example, by an antenna, a feeder, and a codec in the communication device. Alternatively, if the third communication apparatus is a chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the eighth aspect, an example in which the third communication apparatus is a terminal device and includes the processing module and the transceiver module is still used for description.

The transceiver module is configured to communicate with another communication apparatus.

The processing module is configured to determine that the communication apparatus is in a relaxed measurement state of a serving cell.

The processing module is further configured to determine, based on a first configuration parameter, that a relaxed measurement condition of a neighboring cell is met, where the first configuration parameter is different from a second configuration parameter, and the second configuration parameter is used to determine the relaxed measurement condition of the neighboring cell when the third communication apparatus is in a normal measurement state of the serving cell.

In an optional implementation, the processing module is configured to determine, in the following manner by using the first configuration parameter, whether the relaxed measurement condition of the neighboring cell is met: when the following conditions are met, determining that the relaxed measurement condition of the neighboring cell is met:
  a relaxed monitoring criterion is met within first duration;
  less than fourth duration has passed since measurement for cell reselection is last performed; and
  measurement of the neighboring cell has been performed within at least the first duration after a new cell is selected or reselected, where
  the first configuration parameter includes information about the first duration.

In an optional implementation, the first configuration parameter includes a first threshold, and the first threshold, a reference value, and current quality of the serving cell are used to determine that the relaxed monitoring criterion is met.

In an optional implementation, the processing module is further configured to:
  measure the serving cell, and determine a measurement result;
  determine a measurement periodicity corresponding to the measurement result; and
  measure the serving cell based on the measurement periodicity.

In an optional implementation,
  better signal quality of the serving cell indicates a longer length of the corresponding measurement periodicity, or poorer signal quality of the serving cell indicates a shorter length of the corresponding measurement periodicity, where the measurement result is used to indicate the signal quality of the serving cell; and/or
  better received signal strength of the serving cell indicates a longer length of the corresponding measurement periodicity, or poorer received signal strength of the serving cell indicates a shorter length of the corresponding measurement periodicity, where the measurement result is used to indicate the received signal strength of the serving cell.

For technical effects brought by the eighth aspect or the optional implementations, refer to the descriptions of the technical effects brought by the third aspect or the corresponding implementations.

According to a ninth aspect, a communication apparatus is provided. The communication apparatus is, for example, the fourth communication apparatus described above. The fourth communication apparatus is configured to perform the method according to any one of the fourth aspect or the possible implementations. Specifically, the fourth communication apparatus may include modules configured to perform the method according to any one of the fourth aspect or the possible implementations, for example, include a processing module and a transceiver module. For example, the transceiver module may include a sending module and a receiving module. The sending module and the receiving module may be different functional modules, or may be a same functional module but can implement different functions. For example, the fourth communication apparatus is a communication device, or is a chip or another component disposed in the communication device. For example, the communication device is a network device. An example in which the fourth communication apparatus is a network device is used below. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the fourth communication apparatus is a communication device, the transceiver is implemented, for example, by an antenna, a feeder, and a codec in the communication device. Alternatively, if the fourth communication apparatus is a chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the ninth aspect, an example in which the fourth communication apparatus is a network device and includes the processing module and the transceiver module is still used for description.

The processing module is configured to determine a first configuration parameter and a second configuration parameter, where the first configuration parameter is used to determine a relaxed measurement condition of a neighboring cell when the fourth communication apparatus is in a relaxed measurement state of a serving cell, the second configuration parameter is used to determine the relaxed measurement condition of the neighboring cell when the fourth communication apparatus is in a normal measurement state of the serving cell, and the first configuration parameter is different from the second configuration parameter.

The transceiver module is configured to send the first configuration parameter and the second configuration parameter to a terminal device.

For technical effects brought by the ninth aspect or the optional implementations, refer to descriptions of the technical effects brought by the fourth aspect or the corresponding implementations.

According to a tenth aspect, a communication apparatus is provided. The communication apparatus is, for example, the fifth communication apparatus described above. The fifth communication apparatus is configured to perform the method according to any one of the fifth aspect or the possible implementations. Specifically, the fifth communication apparatus may include modules configured to perform the method according to any one of the fifth aspect or the possible implementations, for example, include a processing module and a transceiver module. For example, the transceiver module may include a sending module and a receiving module. The sending module and the receiving module may be different functional modules, or may be a same functional module but can implement different functions. For example, the fifth communication apparatus is a communication device, or is a chip or another component disposed in the communication device. For example, the communication device is a terminal device. An example in which the fifth communication apparatus is a terminal device is used below. For example, the transceiver module may alternatively be implemented by a transceiver, and the processing module may alternatively be implemented by a processor. Alternatively, the sending module may be implemented by a transmitter, and the receiving module may be implemented by a receiver. The transmitter and the receiver may be different functional modules, or may be a same functional module but can implement different functions. If the fifth communication apparatus is a communication device, the transceiver is implemented, for example, by an antenna, a feeder, and a codec in the communication device. Alternatively, if the fifth communication apparatus is a chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the tenth aspect, an example in which the fifth communication apparatus is a terminal device and includes the processing module and the transceiver module is still used for description.

The transceiver module is configured to communicate with another communication apparatus.

The processing module is configured to: measure a serving cell, and determine a measurement result.

The processing module is further configured to determine a measurement periodicity corresponding to the measurement result.

The processing module is further configured to measure the serving cell based on the measurement periodicity.

In an optional implementation,
better signal quality of the serving cell indicates a longer length of the corresponding measurement periodicity, or poorer signal quality of the serving cell indicates a shorter length of the corresponding measurement periodicity, where the measurement result is used to indicate the signal quality of the serving cell; and/or
better received signal strength of the serving cell indicates a longer length of the corresponding measurement periodicity, or poorer received signal strength of the serving cell indicates a shorter length of the corresponding measurement periodicity, where the measurement result is used to indicate the received signal strength of the serving cell.

For technical effects brought by the tenth aspect or the optional implementations, refer to the descriptions of the technical effects brought by the fifth aspect or the corresponding implementations.

According to an eleventh aspect, a communication apparatus is provided. The communication apparatus is, for example, the first communication apparatus described above. The communication apparatus includes a processor and a communication interface. The communication interface may be configured to communicate with another apparatus or device. Optionally, the communication apparatus may further include a memory, configured to store computer instructions. The processor and the memory are coupled to each other, to implement the method according to any one of the first aspect or the possible implementations. Alternatively, the first communication apparatus may not include a memory, and the memory may be located outside the first communication apparatus. The processor, the memory, and the communication interface are coupled to each other, to implement the method according to any one of the first aspect or the possible implementations. For example, when the processor executes the computer instructions stored in the memory, the first communication apparatus is enabled to perform the method according to any one of the first aspect or the possible implementations. For example, the first communication apparatus is a communication device, or is a chip or another component disposed in the communication device. For example, the communication device is a terminal device.

If the first communication apparatus is a communication device, the communication interface is implemented, for example, by a transceiver (or a transmitter and a receiver) in the communication device, and the transceiver is implemented, for example, by an antenna, a feeder, and a codec in the communication device. Alternatively, if the first communication apparatus is a chip disposed in the communication device, the communication interface is, for example, an input/output interface such as an input/output pin of the chip. The communication interface is connected to a radio frequency transceiver component in the communication device, to send and receive information through the radio frequency transceiver component.

According to a twelfth aspect, a communication apparatus is provided. The communication apparatus is, for example, the second communication apparatus described above. The communication apparatus includes a processor and a communication interface. The communication interface may be configured to communicate with another apparatus or device. Optionally, the communication apparatus may further include a memory, configured to store computer instructions. The processor and the memory are coupled to each other, to implement the method according to any one of the second aspect or the possible implementations. Alternatively, the second communication apparatus may not include a memory, and the memory may be located outside the second communication apparatus. The processor, the memory, and the communication interface are coupled to each other, to implement the method according to any one of the second aspect or the possible implementations. For example, when the processor executes the computer instructions stored in the memory, the second communication apparatus is enabled to perform the method according to any one of the second aspect or the possible implementations.

For example, the second communication apparatus is a communication device, or is a chip or another component disposed in the communication device. For example, the communication device is a network device.

If the second communication apparatus is a communication device, the communication interface is implemented, for example, by a transceiver (or a transmitter and a receiver) in the communication device, and the transceiver is implemented, for example, by an antenna, a feeder, and a codec in the communication device. Alternatively, if the second communication apparatus is a chip disposed in the communication device, the communication interface is, for example, an input/output interface such as an input/output pin of the chip. The communication interface is connected to a radio frequency transceiver component in the communication device, to send and receive information through the radio frequency transceiver component.

According to a thirteenth aspect, a communication apparatus is provided. The communication apparatus is, for example, the third communication apparatus described above. The communication apparatus includes a processor and a communication interface. The communication interface may be configured to communicate with another apparatus or device. Optionally, the communication apparatus may further include a memory, configured to store computer instructions. The processor and the memory are coupled to each other, to implement the method according to any one of the third aspect or the possible implementations. Alternatively, the third communication apparatus may not include a memory, and the memory may be located outside the third communication apparatus. The processor, the memory, and the communication interface are coupled to each other, to implement the method according to any one of the third aspect or the possible implementations. For example, when the processor executes the computer instructions stored in the memory, the third communication apparatus is enabled to perform the method according to any one of the third aspect or the possible implementations. For example, the third communication apparatus is a communication device, or is a chip or another component disposed in the communication device. For example, the communication device is a terminal device.

If the third communication apparatus is a communication device, the communication interface is implemented, for example, by a transceiver (or a transmitter and a receiver) in the communication device, and the transceiver is implemented, for example, by an antenna, a feeder, and a codec in the communication device. Alternatively, if the third communication apparatus is a chip disposed in the communication device, the communication interface is, for example, an input/output interface such as an input/output pin of the chip. The communication interface is connected to a radio frequency transceiver component in the communication device, to send and receive information through the radio frequency transceiver component.

According to a fourteenth aspect, a communication apparatus is provided. The communication apparatus is, for example, the fourth communication apparatus described above. The communication apparatus includes a processor and a communication interface. The communication interface may be configured to communicate with another apparatus or device. Optionally, the communication apparatus may further include a memory, configured to store computer instructions. The processor and the memory are coupled to each other, to implement the method according to any one of the fourth aspect or the possible implementations. Alternatively, the fourth communication apparatus may not include a memory, and the memory may be located outside the fourth communication apparatus. The processor, the memory, and the communication interface are coupled to each other, to implement the method according to any one of the fourth aspect or the possible implementations. For example, when the processor executes the computer instructions stored in the memory, the fourth communication apparatus is enabled to perform the method according to any one of the fourth aspect or the possible implementations. For example, the fourth communication apparatus is a communication device, or is a chip or another component disposed in the communication device. For example, the communication device is a network device.

If the fourth communication apparatus is a communication device, the communication interface is implemented, for example, by a transceiver (or a transmitter and a receiver) in the communication device, and the transceiver is implemented, for example, by an antenna, a feeder, and a codec in the communication device. Alternatively, if the fourth communication apparatus is a chip disposed in the communication device, the communication interface is, for example, an input/output interface such as an input/output pin of the chip. The communication interface is connected to a radio frequency transceiver component in the communication device, to send and receive information through the radio frequency transceiver component.

According to a fifteenth aspect, a communication apparatus is provided. The communication apparatus is, for example, the fifth communication apparatus described above. The communication apparatus includes a processor and a communication interface. The communication interface may be configured to communicate with another apparatus or device. Optionally, the communication apparatus may further include a memory, configured to store computer instructions. The processor and the memory are coupled to each other, to implement the method according to any one of the fifth aspect or the possible implementations. Alternatively, the fifth communication apparatus may not include a memory, and the memory may be located outside the fifth communication apparatus. The processor, the memory, and the communication interface are coupled to each other, to implement the method according to any one of the fifth aspect or the possible implementations. For example, when the processor executes the computer instructions stored in the memory, the fifth communication apparatus is enabled to perform the method according to any one of the fifth aspect or the possible implementations. For example, the fifth communication apparatus is a communication device, or is a chip or another component disposed in the communication device. For example, the communication device is a terminal device.

If the fifth communication apparatus is a communication device, the communication interface is implemented, for example, by a transceiver (or a transmitter and a receiver) in the communication device, and the transceiver is implemented, for example, by an antenna, a feeder, and a codec in the communication device. Alternatively, if the fifth communication apparatus is a chip disposed in the communication device, the communication interface is, for example, an input/output interface such as an input/output pin of the chip. The communication interface is connected to a radio frequency transceiver component in the communication device, to send and receive information through the radio frequency transceiver component.

According to a sixteenth aspect, a chip is provided. The chip includes a processor and a communication interface. The processor is coupled to the communication interface, and is configured to implement the method provided in any one of the first aspect or the optional implementations.

Optionally, the chip may further include a memory. For example, the processor may read and execute a software program stored in the memory, to implement the method according to any one of the first aspect or the optional implementations. Alternatively, the memory may not be included in the chip, but is located outside the chip. This is equivalent to that the processor may read and execute a software program stored in an external memory, to implement the method according to any one of the first aspect or the optional implementations.

According to a seventeenth aspect, a chip is provided. The chip includes a processor and a communication interface. The processor is coupled to the communication interface, and is configured to implement the method provided in any one of the second aspect or the optional implementations.

Optionally, the chip may further include a memory. For example, the processor may read and execute a software program stored in the memory, to implement the method according to any one of the second aspect or the optional implementations. Alternatively, the memory may not be included in the chip, but is located outside the chip. This is equivalent to that the processor may read and execute a software program stored in an external memory, to implement the method according to any one of the second aspect or the optional implementations.

According to an eighteenth aspect, a chip is provided. The chip includes a processor and a communication interface. The processor is coupled to the communication interface, and is configured to implement the method provided in any one of the third aspect or the optional implementations.

Optionally, the chip may further include a memory. For example, the processor may read and execute a software program stored in the memory, to implement the method according to any one of the third aspect or the optional implementations. Alternatively, the memory may not be included in the chip, but is located outside the chip. This is equivalent to that the processor may read and execute a software program stored in an external memory, to implement the method according to any one of the third aspect or the optional implementations.

According to a nineteenth aspect, a chip is provided. The chip includes a processor and a communication interface. The processor is coupled to the communication interface, and is configured to implement the method provided in any one of the fourth aspect or the optional implementations.

Optionally, the chip may further include a memory. For example, the processor may read and execute a software program stored in the memory, to implement the method according to any one of the fourth aspect or the optional implementations. Alternatively, the memory may not be included in the chip, but is located outside the chip. This is equivalent to that the processor may read and execute a software program stored in an external memory, to implement the method according to any one of the fourth aspect or the optional implementations.

According to a twentieth aspect, a chip is provided. The chip includes a processor and a communication interface. The processor is coupled to the communication interface, and is configured to implement the method provided in any one of the fifth aspect or the optional implementations.

Optionally, the chip may further include a memory. For example, the processor may read and execute a software program stored in the memory, to implement the method according to any one of the fifth aspect or the optional implementations. Alternatively, the memory may not be included in the chip, but is located outside the chip. This is equivalent to that the processor may read and execute a software program stored in an external memory, to implement the method according to any one of the fifth aspect or the optional implementations.

According to a twenty-first aspect, a first communication system is provided. The communication system includes the communication apparatus according to the sixth aspect, the communication apparatus according to the eleventh aspect, or the communication apparatus according to the sixteenth aspect, and includes the communication apparatus according to the seventh aspect, the communication apparatus according to the twelfth aspect, or the communication apparatus according to the seventeenth aspect.

According to a twenty-second aspect, a second communication system is provided. The communication system includes the communication apparatus according to the eighth aspect, the communication apparatus according to the thirteenth aspect, or the communication apparatus according to the eighteenth aspect, and includes the communication apparatus according to the ninth aspect, the communication apparatus according to the fourteenth aspect, or the communication apparatus according to the nineteenth aspect.

According to a twenty-third aspect, a third communication system is provided. The communication system includes the communication apparatus according to the tenth aspect, the communication apparatus according to the fifteenth aspect, or the communication apparatus according to the twentieth aspect.

According to a twenty-fourth aspect, a computer-readable storage medium is provided. The computer-readable storage medium is configured to store computer instructions. When the computer instructions are run on a computer, the computer is enabled to perform the method according to any one of the first aspect or the possible implementations.

According to a twenty-fifth aspect, a computer-readable storage medium is provided. The computer-readable storage medium is configured to store computer instructions. When the computer instructions are run on a computer, the computer is enabled to perform the method according to any one of the second aspect or the possible implementations.

According to a twenty-sixth aspect, a computer-readable storage medium is provided. The computer-readable storage medium is configured to store computer instructions. When the computer instructions are run on a computer, the computer is enabled to perform the method according to any one of the third aspect or the possible implementations.

According to a twenty-seventh aspect, a computer-readable storage medium is provided. The computer-readable storage medium is configured to store computer instructions. When the computer instructions are run on a computer, the computer is enabled to perform the method according to any one of the fourth aspect or the possible implementations.

According to a twenty-eighth aspect, a computer-readable storage medium is provided. The computer-readable storage medium is configured to store computer instructions. When the computer instructions are run on a computer, the computer is enabled to perform the method according to any one of the fifth aspect or the possible implementations.

According to a twenty-ninth aspect, a computer program product including instructions is provided. The computer program product is configured to store computer instructions. When the computer instructions are run on a computer, the computer is enabled to perform the method according to any one of the first aspect or the possible implementations.

According to a thirtieth aspect, a computer program product including instructions is provided. The computer program product is configured to store computer instructions. When the computer instructions are run on a computer, the computer is enabled to perform the method according to any one of the second aspect or the possible implementations.

According to a thirty-first aspect, a computer program product including instructions is provided. The computer program product is configured to store computer instructions. When the computer instructions are run on a computer, the computer is enabled to perform the method according to any one of the third aspect or the possible implementations.

According to a thirty-second aspect, a computer program product including instructions is provided. The computer program product is configured to store computer instructions. When the computer instructions are run on a computer, the computer is enabled to perform the method according to any one of the fourth aspect or the possible implementations.

According to a thirty-third aspect, a computer program product including instructions is provided. The computer program product is configured to store computer instructions. When the computer instructions are run on a computer, the computer is enabled to perform the method according to any one of the fifth aspect or the possible implementations.

According to the measurement method provided in embodiments of this application, a network device may indicate a terminal device that meets a first measurement reporting condition to enter a relaxed measurement state of a serving cell, to reduce a measurement process of the serving cell, so as to save power.

DETAILED DESCRIPTION

Figure 1:
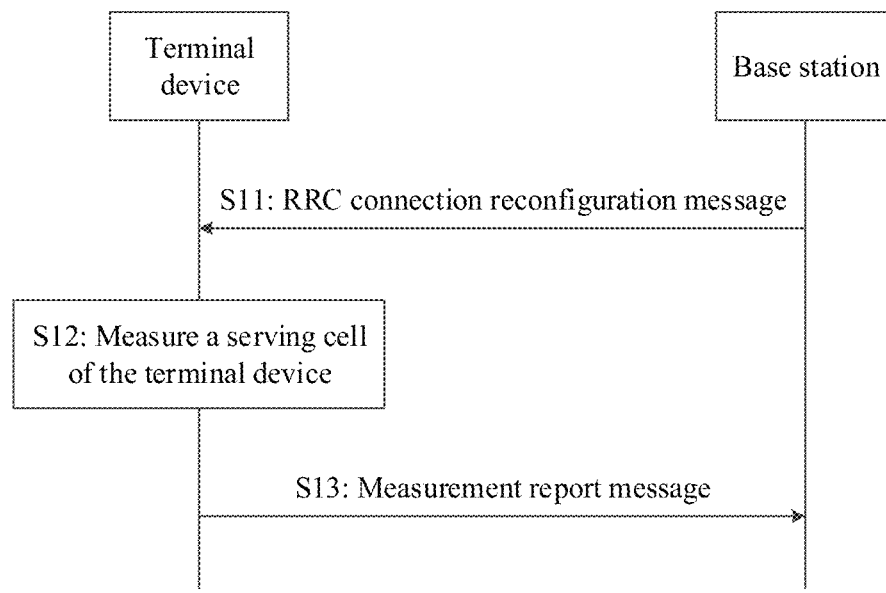
FIG. 1 is a flowchart of a measurement process of a terminal device in an RRC connected state.

The following describes some terms in embodiments of this application, to facilitate understanding of a person skilled in the art.

(1) Terminal device: a terminal device includes a device that provides voice and/or data connectivity for a user, and specifically, includes a device that provides voice for the user, includes a device that provides data connectivity for the user, or includes a device that provides voice and data connectivity for the user. For example, the terminal device may include a handheld device having a wireless connection function or a processing device connected to a wireless modem. The terminal device may communicate with a core network through a radio access network (RAN), and exchange voice or data with the RAN, or exchange voice and data with the RAN. The terminal device may include user equipment (UE), a wireless terminal device, a mobile terminal device, a device-to-device communication (D2D) communication terminal device, a vehicle-to-everything (V2X) terminal device, a machine-to-machine/machine type communication (M2M/MTC) terminal device, an internet of things (IoT) terminal device, a light terminal device (light UE), a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, or the like. For example, the terminal device is a personal communications service (PCS) phone, a cordless telephone set, a session initiation protocol (SIP) phone, a wireless local loop (WLL) station, or a personal digital assistant (PDA). The terminal device further includes a limited device, for example, a device having low power consumption, a device having a limited storage capability, or a device having a limited computing capability. For example, the terminal device includes an information sensing device such as a barcode, radio frequency identification (RFID), a sensor, a global positioning system (GPS), or a laser scanner.

By way of example but not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn on the body or integrated into clothes or an accessory of a user. The wearable device is not merely a hardware device, but is used to implement a powerful function through software support, data interaction, and cloud interaction. In a broad sense, wearable intelligent devices include full-featured and large-sized devices that can implement all or some functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

If the various terminal devices described above are located on a vehicle (for example, placed in the vehicle or installed in the vehicle), the terminal devices all may be considered as vehicle-mounted terminal devices. The vehicle-mounted terminal devices are also referred to as, for example, on-board units (OBUs).

In embodiments of this application, the terminal device may further include a relay. Alternatively, it may be understood that any device that can perform data communication with a base station may be considered as a terminal device.

In embodiments of this application, an apparatus configured to implement a function of the terminal device may be a terminal device, or may be an apparatus that can support the terminal device in implementing the function, for example, a chip system. The apparatus may be installed in the terminal device. In embodiments of this application, the chip system may include a chip, or may include a chip and another discrete component. In the technical solutions provided in embodiments of this application, an example in which the apparatus configured to implement the function of the terminal device is a terminal device is used to describe the technical solutions provided in embodiments of this application.

(2) Network device: a network device includes, for example, an access network (AN) device, for example, a base station (for example, an access point), and may be a device that communicates with a wireless terminal device in one or more cells over an air interface in an access network, or may be, for example, a road side unit (RSU) in a vehicle-to-everything (V2X) technology. The base station may be configured to mutually convert a received over-the-air frame and an internet protocol (IP) packet, and serve as a router between the terminal device and a remaining part of the access network. The remaining part of the access network may include an IP network. The RSU may be a fixed infrastructure entity supporting a V2X application, and may exchange messages with another entity supporting the V2X application. The network device may further coordinate attribute management of the air interface. For example, the network device may include an evolved NodeB (eNB, or e-NodeB) in a long term evolution (LTE) system or a long term evolution-advanced (LTE-A) system, may include a next generation NodeB (gNB) in a 5th generation (5G) mobile communication technology new radio (NR) system, or may include a centralized unit (CU) and a distributed unit (DU) in a cloud radio access network (Cloud RAN) system. This is not limited in embodiments of this application.

The network device may further include a core network device. The core network device includes, for example, an access and mobility management function (AMF) or a user plane function (UPF).

Because embodiments of this application mainly relate to an access network device, the network device in the following is an access network device unless otherwise specified.

In embodiments of this application, an apparatus configured to implement a function of the network device may be a network device, or may be an apparatus that can support the network device in implementing the function, for example, a chip system. The apparatus may be installed in the network device. In the technical solutions provided in embodiments of this application, an example in which the apparatus configured to implement a function of the network device is a network device is used to describe the technical solutions provided in embodiments of this application.

(3) RRC state: a terminal device has three RRC states: an RRC connected state, an RRC idle state, and an RRC inactive state.

RRC connected state (which may also be referred to as a connected state, where in this specification, the "connected state" and the "RRC connected state" are a same concept and may be interchanged): the terminal device has established an RRC connection to a network, and may perform data transmission.

RRC idle state (which may also be referred to as an idle state, where in this specification, the "idle state" and the "RRC idle state" are a same concept, and may be interchanged): the terminal device does not establish an RRC connection to a network, and a base station does not store a context of the terminal device. If the terminal device needs to enter the RRC connected state from the RRC idle state, the terminal device needs to initiate an RRC connection establishment process.

RRC inactive state (which may also be referred to as an inactive state, where in this specification, a "deactivated state", a "deactivated state", the "inactive state", the "RRC inactive state", an "RRC deactivated state", and the like are a same concept and may be interchanged): the terminal device previously enters an RRC connected state via an anchor base station. The anchor base station then releases an RRC connection, but stores a context of the terminal device. If the terminal device needs to re-enter the RRC connected state from the RRC inactive state, the terminal device needs to initiate an RRC connection resume process (or referred to as an RRC connection reestablishment process) on a base station on which the terminal device currently camps. Because the terminal device may be in a moving state, the base station on which the terminal device currently camps and the anchor base station of the terminal device may be a same base station, or may be different base stations. Compared with an RRC connection establishment process, an RRC connection resume process has a shorter latency and smaller signaling overheads. However, the base station needs to store the context of the terminal device, causing storage overheads of the base station.

(4) "At least one" means one or more, and "a plurality of" means two or more. The term "and/or" describes an association relationship between associated objects and represents that three relationships may exist. For example, A and/or B may represent the following cases: only A exists, both A and B exist, and only B exists, where A and B may be singular or plural. The character "/" generally represents an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise stated, in embodiments of this application, ordinal numbers such as "first" and "second" are intended to distinguish between a plurality of objects, and not intended to limit an order, a time sequence, a priority, or importance of the plurality of objects. For example, first information and second information are merely intended to distinguish between different signaling, but do not indicate that the two types of information are different in content, priorities, a sending sequence, importance, or the like.

The foregoing describes some concepts in embodiments of this application. The following describes technical features in embodiments of this application.

Mobility management is an important part in wireless mobile communication. Mobility management is a general term of related content used to ensure that interruption of a communication link between a network and a terminal device is not caused by movement of the terminal device. Based on a status of the terminal device, mobility management may be roughly classified into two parts: mobility management in an RRC idle state and mobility management in an RRC connected state. The mobility management in an RRC idle state mainly refers to a cell selection/reselection process. The mobility management in an RRC connected state mainly refers to a cell handover process. Both cell selection/reselection and cell handover are performed based on a measurement result. Therefore, measurement is a basis of mobility management.

Measurement by the terminal device includes measurement of a serving cell of the terminal device, and further includes measurement of a neighboring cell, for example, measurement of a neighboring cell in a same communication system, or measurement of an inter-RAT neighboring cell. Based on layers used in measurement, the measurement can be classified into physical layer measurement (layer 1 measurement) and RRC layer measurement (layer 3 measurement). Layer 3 measurement is mainly discussed herein.

When the terminal device is in the RRC connected state, for a measurement process, refer to FIG. 1.

S11: a base station sends an RRC connection reconfiguration message to a terminal device, and the terminal device receives the RRC connection reconfiguration message from the base station. The base station is, for example, a base station that provides a serving cell of the terminal device.

The RRC connection reconfiguration message includes a measurement configuration (measConfig) information element, the measurement configuration information element includes measurement configuration information, and the terminal device obtains the measurement configuration information from the measurement configuration information element. The measurement configuration information includes, for example, a measurement object of the terminal device.

S12: the terminal device measures the serving cell of the terminal device.

In addition, the terminal device further determines, based on information included in an s-measurement configuration (MeasureConfig) information element in the RRC connection reconfiguration message, whether to measure a neighboring cell. The s-MeasureConfig information element may include a measurement control threshold (related to performing measurement of the neighboring cell).

The terminal device may receive a reference signal from the serving cell, to measure the serving cell. The reference signal includes, for example, synchronization signal/physical broadcast channel block (SSB) or a channel state information reference signal (CSI-RS).

S13: the terminal device sends a measurement report message to the base station, and the base station receives the measurement report message from the terminal device. When a trigger condition of a measurement report is met, the terminal device adds a measurement result to the measurement report message, and sends, to the base station, the measurement report message to which the measurement result is added.

The trigger condition of the measurement report includes a periodicity trigger condition and an event trigger condition. If the trigger condition is the periodicity trigger condition, the terminal device sends the measurement report message to the base station in a corresponding periodicity. If an event triggers reporting, in an example, the measurement configuration message indicates the corresponding event, and when the event is met, the terminal device may send the measurement report message to the base station. In addition, the measurement configuration message may further include a parameter such as a threshold or hysteresis parameter corresponding to the event, for subsequent calculation. Table 1 defines each type of event.

TABLE 1

| Event | Meaning |
|---|---|
| A1 | Signal quality of the serving cell is poorer than a threshold |
| A2 | Signal quality of the serving cell is poorer than a threshold |
| A3 | Signal quality of the neighboring cell is better than signal quality of a primary cell (primary cell, PCell)/primary secondary cell (primary secondary cell, PSCell) |
| A4 | Signal quality of the neighboring cell is better than a threshold |
| A5 | Signal quality of the serving cell is poorer than threshold 1, and signal quality of the neighboring cell is better than threshold 2 |
| A6 | Signal quality of the neighboring cell is better than signal quality of a secondary cell (secondary Cell, SCell) |
| B1 | Signal quality of an inter-RAT neighboring cell is better than a threshold |
| B2 | Signal quality of the serving cell is poorer than threshold 1, and signal quality of an inter-RAT neighboring cell is better than threshold 2 |

In Table 1, "meaning" indicates a specific type of a corresponding event. In addition, each event has a corresponding "entering condition" and "leaving condition". The "entering condition" indicates a condition that needs to be met to enter the event, and the "leaving condition" indicates a condition that needs to be met to leave the event. The event A1 in Table 1 is used as an example. The event A1 refers to an event in which a service of the serving cell is better than a threshold. An "entering condition" of the event A1 is indicated by an inequality A1-1, and a "leaving condition" of the event A1 is indicated by an inequality A1-2.

$$Ms - Hys > \text{Thresh} \quad (A1\text{-}1)$$

$$Ms + Hys < \text{Thresh} \quad (A1\text{-}2)$$

For the event A1, Ms indicates a measurement result of the serving cell for the terminal device, and the measurement result may represent quality of service of the serving cell. The measurement result may be one of reference signal received power (RSRP), reference signal received quality (RSRQ), or a signal to interference plus noise ratio (SINR). Hys indicates a hysteresis parameter, and may be an integer ranging from 0 to 30. The network device may configure Hys based on the RRC connection reconfiguration message. Thresh indicates a threshold, and the network device may also configure Thresh based on the RRC connection reconfiguration message. It should be noted that the event A1 in Table 1 is used as an example in this paragraph. Ms described in this paragraph is a parameter that is configured for the event A1 and that is used to represent the measurement result of the serving cell for the terminal device, Hys is the hysteresis parameter configured for the event A1, and Thresh is the threshold configured for the event A1. Parameters (for example, hysteresis parameters or thresholds) configured for different events may be different.

Therefore, the inequality A1-1 indicates that if a difference between the quality of service represented by the measurement result of the serving cell for the terminal device and the hysteresis parameter is greater than the threshold, entering the event A1 occurs, in other words, the event A1 is met. The inequality A1-2 indicates that if a sum of the quality of service represented by the measurement result of the serving cell for the terminal device and the hysteresis parameter is less than the threshold, leaving the event A1 occurs, in other words, the event A1 is not met.

Figure 2:
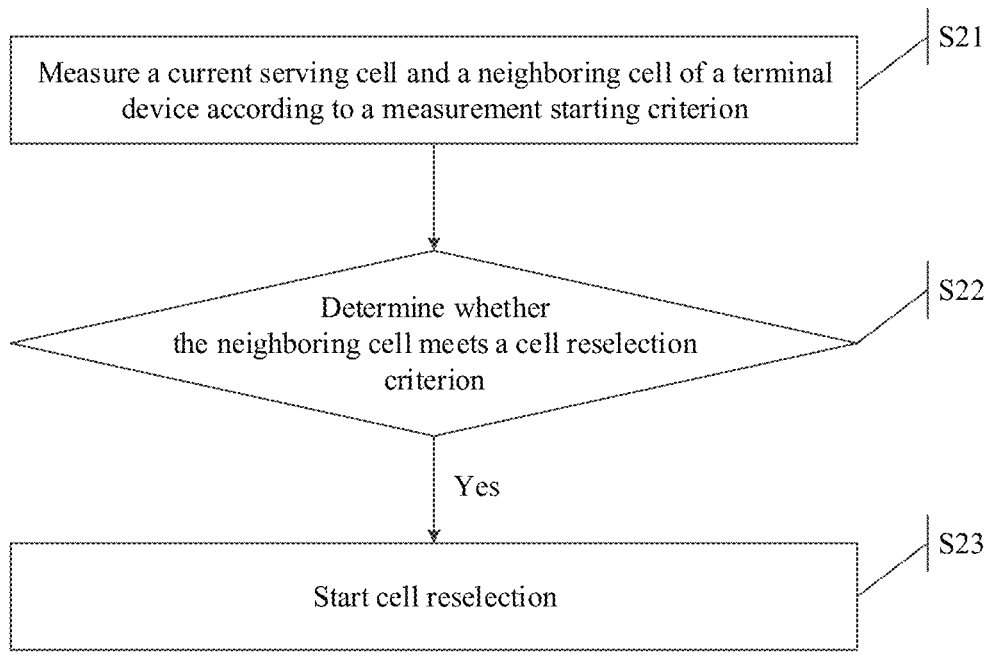
FIG. 2 is a flowchart of performing cell reselection by a terminal device in an RRC idle state.

When the terminal device is in an RRC idle state, mobility management is mainly a cell selection/reselection process. For a process in which the terminal device performs cell reselection, refer to FIG. 2.

S21: a terminal device measures a current serving cell and a neighboring cell of the terminal device according to a measurement starting criterion.

The neighboring cell may include one or more of a cell that has same frequency as the serving cell, a cell that has different frequency from the serving cell, or an inter-RAT cell that is located in a communication system different from that of the serving cell.

S22: determine whether the neighboring cell meets a cell reselection criterion.

S23: if the neighboring cell meets the cell reselection criterion, start cell reselection.

For example, if a first cell in the neighboring cell meets the cell reselection criterion, the terminal device may receive a system message from the first cell. If there is no condition such as limited access in the first cell, the terminal device may camp on the first cell.

Alternatively, if the first cell does not meet the cell reselection criterion, or although the first cell meets the cell reselection criterion, a condition such as limited access is set for the first cell, and consequently the terminal device cannot camp on the first cell, the terminal device continues to camp on the current serving cell.

Currently, for mobility management of a terminal device in an RRC idle state or an RRC inactive state, there are the following regulations. These regulations are specific to a measurement process of a serving cell.

(1) The measurement process is performed at least once every M1*N1 discontinuous reception (DRX) cycle.

If an SSB-based measurement timing configuration (SMTC) periodicity ($T_{SMTC}$)>20 ms and a DRX cycle≤0.64 seconds, M1=2; otherwise, M1=1.

For SSB measurement by the terminal device, a base station configures an SMTC. Generally, one SMTC is configured for one piece of frequency. The SMTC may be understood as a time window used for measurement. In time domain, one SMTC may include SSBs sent in all cells on frequency corresponding to the SMTC. For example, the base station configures a corresponding SMTC for frequency f1, and the terminal device measures SSBs only in the SMTC. Therefore, the SMTC includes, in time domain, SSBs that the base station intends the terminal device to measure and that are sent in all cells on the frequency f1.

(2) Filtering once is performed at least every two measurement results, and there is an interval of at least ½ DRX cycle between two measurement results that are used for filtering once and that are in a plurality of measurement results.

(3) If the serving cell does not satisfy a cell selection S criterion in consecutive Nserv DRX cycles, the terminal device directly starts measurement of all neighboring cells (that are indicated by the serving cell) (where whether measurement conditions of the neighboring cells are satisfied is not considered in this case).

(4) Within 10 s, if no new suitable cell is found through searching and measurement by using intra-frequency information, inter-frequency information, and inter-radio access technology (RAT) information that are indicated in system information, the terminal device starts cell selection for a selected public land mobile network (PLMN).

If the terminal device measures neighboring cells, the terminal device measures an intra-frequency neighboring cell, an inter-frequency neighboring cell, and an inter-RAT neighboring cell (namely, a neighboring cell indicated by the inter-RAT information) that are indicated by the system information. In other words, within 10 s, if the terminal device finds no suitable cell through measuring these neighboring cells, the terminal device measures more cells in the selected PLMN.

To reduce power consumption of the terminal device, a relaxed measurement condition of a neighboring cell is further specified in an LTE system. If the relaxed measurement condition of the neighboring cell is met, the terminal device may choose not to perform intra-frequency measurement or inter-frequency measurement, or the terminal device may not perform measurement of the neighboring cell. The relaxed measurement condition of the neighboring cell is as follows:

a relaxed monitoring criterion is met within $T_{SearchDeltaP}$;

less than 24 hours have passed since measurement for cell reselection is last performed; and the terminal device has performed intra-frequency measurement or inter-frequency measurement within at least $T_{SearchDeltaP}$ after a new cell is selected or reselected.

The relaxed monitoring criterion may be indicated according to Formula 1:

$$(S_{rxlevRef} - S_{rxlev}) < S_{SearchDeltaP} \quad \text{(Formula 1)}$$

$S_{rxlev}$ indicates a cell reselection received signal level/cell reselection received signal strength (cell selection RX level value), and is in a unit of dB. $S_{rxlev}$ can be used to evaluate current signal quality of the serving cell. $S_{SearchDeltaP}$ indicates a threshold. $S_{rxlevRef}$ indicates a reference value (which is in a unit of dB) of the serving cell of the terminal device. $S_{rxlevRef}$ may have an initial value, and may be updated later. An update manner is as follows.

After the terminal device selects or reselects the new cell, if $(S_{rxlev} - S_{rxlevRef}) > 0$, or if the relaxed monitoring criterion within $T_{SearchDeltaP}$ has not been met, the terminal device should set a value of $S_{rxlevRef}$ to a current value of $S_{rxlev}$ of the serving cell of the terminal device.

$T_{SearchDeltap}$ indicates duration. Generally, the duration is 5 minutes. Alternatively, if enhanced DRX (eDRX) is configured for the terminal device and a length of the eDRX cycle is greater than 5 minutes, $T_{SearchDeltaP}$ is the length of the eDRX cycle.

$S_{rxlev}$ may be used to indicate the quality of the serving cell of the terminal device. For example, $S_{rxlev}$ satisfies Formula 2:

$$S_{rxlev} = Q_{rxlevmeas} - (Q_{rxlevmin} + Q_{rxlevminoffset}) - P_{compensation} \quad \text{(Formula 2)}$$

In Formula 2, $Q_{rxlevmeas}$ indicates RSRP of a candidate cell. $Q_{rxlevmin}$ and $Q_{rxlevminoffset}$ are minimum receive levels configured in a system information block (SIB) (for example, configured in SIB1) for camping on a cell, and $Q_{rxlevminoffset}$ is used only when the terminal device camps on a visited PLMN cell.

A value of $P_{compensation}$ is max (PEMAX−PUMAX,0), and is in a unit of dB. max (x,y) indicates that a maximum of x and y is used. PEMAX indicates maximum uplink transmit power that can be used by the terminal device, and PUMAX indicates maximum radio frequency output power of the terminal device.

It can be learned that, currently, a process in which a terminal device measures a serving cell is always performed, and measurement of a neighboring cell is performed only when a specific condition is met. In addition, a relaxed measurement condition of a neighboring cell is further set for measurement of the neighboring cell in an LTE system. If the relaxed measurement condition of the neighboring cell is met, the terminal device may not perform measurement of the neighboring cell. In these manners, power consumption of the terminal device caused by measurement can be reduced.

For some terminal devices, for example, a terminal device in a static state, a terminal device with a low moving speed, or a terminal device that moves only in a scope, a probability of performing cell reselection or cell handover is low. However, the process in which a terminal device measures a serving cell is always performed. Such a terminal device continuously measures the serving cell, but utilization of a measurement result is not high. Therefore, it may be considered that the measurement process is unnecessary and causes high power consumption of the terminal device.

In view of this, the technical solutions in embodiments of this application are provided. In embodiments of this application, a terminal device may determine whether a first measurement reporting condition is met. If the first measurement reporting condition is met, it indicates that there is a low probability that the terminal device performs cell handover or reselection. For example, the terminal device may be located in a center of a serving cell, may have low mobility, or may have a small activity scope. For such a terminal device, frequent measurement of the serving cell is equivalent to an unnecessary measurement process, and causes high power consumption. Therefore, a network device may indicate such a terminal device to enter a relaxed measurement state of the serving cell, to reduce a measurement process of the serving cell, so as to save power.

The technical solutions provided in embodiments of this application may be applied to a 4th generation (4G) mobile communication technology system, for example, an LTE system, or may be applied to a 5G system, for example, an NR system, or may be applied to a next-generation mobile communication system or another similar communication system, provided that one entity can measure a signal from another entity. This is not specifically limited. In addition, an air interface communication process between the network device and the terminal device is used as an example in a description process of embodiments of this application. Actually, the technical solutions provided in embodiments of this application may also be applied to a sidelink (SL), provided that one terminal device can measure a signal from another terminal device. For example, the technical solutions provided in embodiments of this application may be applied to device-to-device (D2D) scenarios such as an NR D2D scenario or an LTE D2D scenario, or may be applied to vehicle-to-everything (V2X) scenarios such as an NR V2X scenario or an LTE V2X scenario. For example, the technical solutions may be applied to the Internet of vehicles such as V2X, LTE-V, or vehicle-to-vehicle (V2V), or may be applied to fields such as intelligent driving or intelligent connected vehicles.

Figure 3:
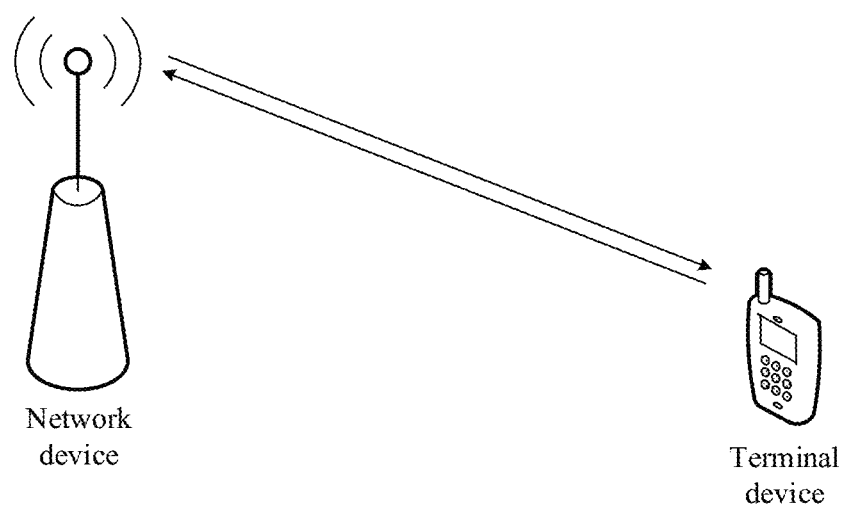
FIG. 3 is a schematic diagram of an application scenario according to an embodiment of this application.

FIG. 3 shows an application scenario according to an embodiment of this application. In FIG. 3, a network device serves a terminal device in a wireless transmission manner. The terminal device may receive a reference signal from the network device, to perform measurement based on the received reference signal.

The network device in FIG. 3 is, for example, a base station. The base station corresponds to different devices in different systems. For example, in a 4G system, the base station may correspond to a 4G base station, for example, an eNB. In a 5G system, the base station corresponds to a 5G base station, for example, a gNB. Certainly, the technical solutions provided in embodiments of this application may also be applied to a future mobile communication system. Therefore, the network device in FIG. 3 may correspond to an access network device in the future mobile communication system. In FIG. 3, an example in which the network device is a base station is used. Actually, with reference to the foregoing descriptions, the network device may alternatively be a device such as an RSU. In addition, an example in which the terminal device in FIG. 3 is a mobile phone is used. Actually, it can be learned from the foregoing descriptions of the terminal device that, the terminal device in embodiments of this application is not limited to a mobile phone.

With reference to the accompanying drawings, the following describes methods provided in embodiments of this application.

Figure 4:
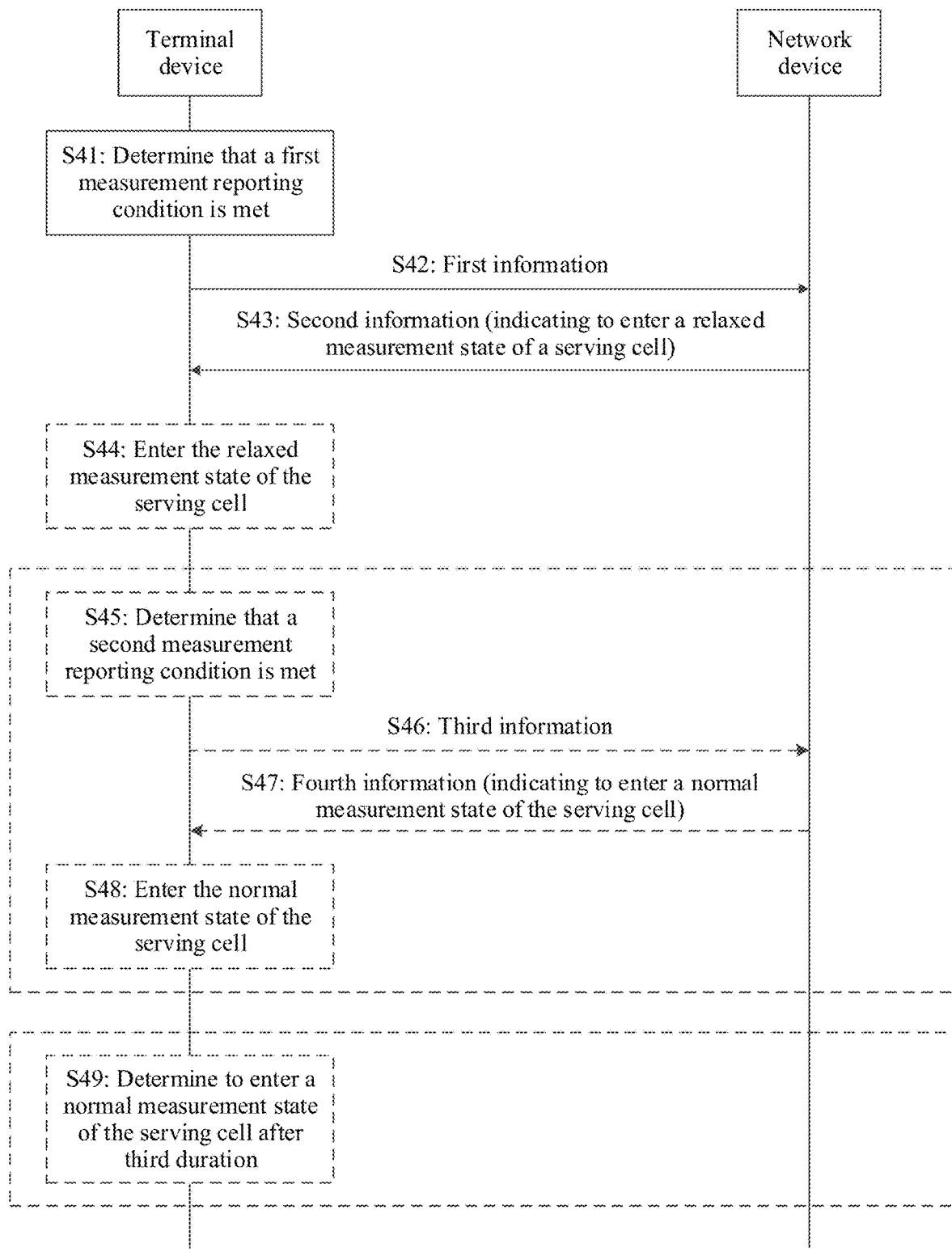
FIG. 4 is a flowchart of a first measurement method according to an embodiment of this application.

An embodiment of this application provides a first measurement method. FIG. 4 is a flowchart of the method. The first measurement method may be applied to a terminal device in an RRC connected mode. The following provides descriptions by using an example in which the method is applied to the network architecture shown in FIG. 3.

For ease of description, the following uses an example in which the method is performed by a network device and a terminal device. For example, this embodiment is applied to the network architecture shown in FIG. 3. Therefore, the network device described below may be the network device in the network architecture shown in FIG. 3, and the terminal device described below may be the terminal device in the network architecture shown in FIG. 3.

S41: the terminal device determines that a first measurement reporting condition is met.

For example, the first measurement reporting condition may be configured by the network device for the terminal device, may be determined by the terminal device, or may be specified in a protocol. For example, the first measurement reporting condition includes that a measurement result (or signal quality of a serving cell, or received signal strength of the serving cell for the terminal device) obtained by measuring the serving cell meets a first threshold, or the first measurement reporting condition includes that a measurement result (or signal quality of a serving cell, or received signal strength of the serving cell for the terminal device) obtained by measuring the serving cell meets a first threshold within first duration. The terminal device may measure the serving cell, and the obtained measurement result may be used for determining of the first measurement reporting condition. The measurement result is used to represent communication quality of the serving cell. Specifically, the measurement result of the serving cell may represent the signal quality of the serving cell, or represent the received signal strength of the serving cell for the terminal device. For example, the measurement result may include one or more of RSRP, RSRQ, or an SINR. If the first measurement reporting condition includes that the signal quality of the serving cell meets the first threshold within the first duration, it means that the measurement result of the serving cell always meets the first threshold within the first duration. The first duration may be configured by the network device for the terminal device, may be determined by the terminal device, may be specified in a protocol, or the like. If the terminal device meets the first measurement reporting condition, it indicates that the signal quality of the serving cell measured by the terminal device and/or the signal strength of the serving cell for the terminal device meet/meets a threshold, it may indicate that the terminal device is located near a cell center, or that the signal quality of the serving cell measured by the terminal device and/or the received signal strength of the serving cell for the terminal device fluctuate/fluctuates slightly, and it may indicate that mobility of the terminal device is weak (where for example, the terminal device is static, the terminal device moves in a small scope, or the terminal device moves slowly). There is a low probability that such a terminal device performs cell reselection or cell handover.

For example, that the signal quality of the serving cell meets the first threshold may include: a measurement result (where for example, the measurement result is RSRP, RSRQ, or an SINR, and the measurement result may also be referred to as a measurement value in this case) obtained by the terminal device by measuring the serving cell within fourth duration meets the first threshold. For example, that a measurement result obtained by the terminal device by measuring the serving cell within fourth duration meets the first threshold may mean that N measurement results obtained by the terminal device by measuring the serving cell within the fourth duration meet the first threshold, and the N measurement results may be all or a part of measurement results obtained by the terminal device within the fourth duration. Alternatively, there may be no concept of fourth duration, and that the signal quality of the serving cell meets the first threshold may include: N measurement results (or referred to as measurement values) obtained by the terminal device by measuring the serving cell meet the first threshold. In this case, the N measurement results may be understood as a set of N measurement results. N may be an integer greater than or equal to 1.

If N is greater than 1, the N measurement results may be N measurement results corresponding to N times of continuous measurement, or the N times of measurement corresponding to the N measurement results may not be continuously performed. If N is greater than 1, in an example, that a measurement result obtained by the terminal device by measuring the serving cell within fourth duration meets the first threshold may include Implementation 1. For example, in Implementation 1, a difference (a variance, or the like) between every K adjacent measurement values of the N measurement values is less than or equal to a first sub-threshold. Alternatively, for example, in Implementation 1, a sum (or a difference) of a difference (a variance, or the like) between every K adjacent measurement values and a first hysteresis parameter is less than or equal to a first sub-threshold. Alternatively, for example, in Implementation 1, a difference (a variance, or the like) between any K measurement values of the N measurement values is less than or equal to a first sub-threshold. Alternatively, for example, in Implementation 1, a sum (or a difference) of a difference (a variance, or the like) between any K measurement values of the N measurement values and a first hysteresis parameter is less than or equal to a first sub-threshold. In Implementation 1, the first threshold may be the first sub-threshold, and that a parameter meets the first threshold means that a value of the parameter is less than or equal to the first threshold. K is an integer greater than or equal to 2, and K is less than or equal to N. For another example, that a measurement result obtained by the terminal device by measuring the serving cell within fourth duration meets the first threshold may include Implementation 2. For example, in Implementation 2, the N measurement values and a first reference value (or may be referred to as a second hysteresis parameter) meet the first threshold. In this case, N may be equal to 1 or may be greater than 1. For example, Implementation 2 may be implemented as follows: a difference between each of the N measurement values and the first reference value is greater than or equal to a second sub-threshold. Alternatively, a difference between each of the N measurement values and the first reference value is greater than or equal to a second sub-threshold. In Implementation 2, the first threshold may be the second sub-threshold, and that a parameter meets the first threshold means that a value of the parameter is greater than or equal to the first threshold. That a measurement result obtained by the terminal device by measuring the serving cell within fourth duration meets the first threshold may include Implementation 1, may include Implementation 2, or may include Implementation 1 and Implementation 2. In addition, a value of the first hysteresis parameter may be greater than 0, less than 0, or equal to 0. If the value of the first hysteresis parameter is equal to 0, it may also be considered that the first hysteresis parameter does not exist, in other words, the first hysteresis parameter does not exist in Implementation 1. A value of the second hysteresis parameter may be greater than 0, less than 0, or equal to 0. If the value of the second hysteresis parameter is equal to 0, it may also be considered that the second hysteresis parameter does not exist, in other words, the second hysteresis parameter does not exist in Implementation 2.

For example, the first reference value may be configured by the network device for the terminal device, may be determined by the terminal device, or may be specified in a protocol. The first sub-threshold may be equal to or unequal to the second sub-threshold. If the first sub-threshold is unequal to the second sub-threshold, the first sub-threshold may be greater than the second sub-threshold, or the first sub-threshold may be less than the second sub-threshold.

For example, that a measurement result obtained by the terminal device by measuring the serving cell within fourth duration meets the first threshold includes only Implementation 1. Implementation 1 is as follows: in the N measurement values, a sum of a difference between every two adjacent measurement values and the first hysteresis parameter is less than or equal to the first sub-threshold, where N=4. The terminal device performs four times of consecutive measurement of the serving cell, and the four times of measurement may be performed continuously or non-continuously. A measurement value of the first measurement is a measurement value 1, a measurement value of the second measurement is a measurement value 2, a measurement value of the third measurement is a measurement value 3, and a measurement value of the fourth measurement is a measurement value 4. If a sum of the first hysteresis parameter and a difference (for example, referred to as a difference 1) between the measurement value 1 and the measurement value 2 is less than or equal to the first sub-threshold, a sum of the first hysteresis parameter and a difference (for example, referred to as a difference 2) between the measurement value 2 and the measurement value 3 is less than or equal to the first sub-threshold, and a sum of the first hysteresis parameter and a difference (for example, referred to as a difference 3) between the measurement value 3 and the measurement value 4 is less than or equal to the first sub-threshold, the terminal device may determine that the measurement result obtained by the terminal device by measuring the serving cell within the fourth duration meets the first threshold. Provided that the sum of the first hysteresis parameter and one of the difference 1, the difference 2, and the difference 3 is greater than the first sub-threshold, the terminal device may determine that the measurement result obtained by the terminal device by measuring the serving cell within the fourth duration does not meet the first threshold. Whether the measurement result obtained by the terminal device by measuring the serving cell within the fourth duration meets the first threshold is determined based on the differences between the measurement values in consecutive measurement, and a plurality of measurement results may be considered, so that a determined result better complies with a current status of the terminal device.

For another example, that a measurement result obtained by the terminal device by measuring the serving cell within fourth duration meets the first threshold includes only Implementation 2. Implementation 2 is that the difference between each of the N measurement values and the first reference value is greater than or equal to the second sub-threshold, where N=3. For example, the terminal device performs three times of measurement of the serving cell, and the three times of measurement may be performed continuously or non-continuously. A measurement value of the first measurement is a measurement value 1, a measurement value of the second measurement is a measurement value 2, and a measurement value of the third measurement is a measurement value 3. If a difference between the measurement value 1 and the first reference value is greater than or equal to the second sub-threshold, a difference between the measurement value 2 and the first reference value is greater than or equal to the second sub-threshold, and a difference between the measurement value 3 and the first reference value is greater than or equal to the second sub-threshold, the terminal device may determine that the measurement result obtained by the terminal device by measuring the serving cell within the fourth duration meets the first threshold. However, if one or more of the three differences are less than the second sub-threshold, the terminal device may determine that the measurement result obtained by the terminal device by measuring the serving cell within the fourth duration does not meet the first threshold. The first reference value is used to determine whether the measurement result obtained by the terminal device by measuring the serving cell within the fourth duration meets the first threshold, so that a determining process is simple.

For another example, that a measurement result obtained by the terminal device by measuring the serving cell within fourth duration meets the first threshold includes Implementation 1 and Implementation 2. If the terminal device determines, in both Implementation 1 and Implementation 2, that the measurement result obtained by the terminal device by measuring the serving cell within the fourth duration meets the first threshold, the terminal device may consider that the measurement result meets the first threshold. If the terminal device determines, in Implementation 1, that the measurement result obtained by measuring the serving cell by the terminal device within the fourth duration meets the first threshold, or determines, in Implementation 2, that the measurement result obtained by measuring the serving cell by the terminal device within the fourth duration does not meet the first threshold, or determines, in both Implementation 1 and Implementation 2, that the measurement result obtained by measuring the serving cell by the terminal device within the fourth duration does not meet the first threshold, the terminal device may consider that the measurement result obtained by the terminal device by measuring the serving cell within the fourth duration does not meet the first threshold.

Certainly, provided that a corresponding implementation can indicate that there is a low probability that the terminal device performs cell reselection or cell handover, that a measurement result obtained by the terminal device by measuring the serving cell within fourth duration meets the first threshold may further include another implementation in addition to the foregoing implementations, or that a measurement result obtained by the terminal device by measuring the serving cell within fourth duration meets the first threshold may not include the foregoing implementations, but include another implementation.

The terminal device may continuously determine whether the terminal device meets the first measurement reporting condition. For example, if the terminal device continuously measures the serving cell, the terminal device may determine, based on the measurement value of the serving cell, whether the terminal device meets the first measurement reporting condition. Alternatively, the terminal device may periodically determine, based on the measurement result of the serving cell, whether the terminal device meets the first measurement reporting condition.

S42: the terminal device sends first information to the network device. The network device receives the first information from the terminal device.

It may be considered that if the terminal device meets the first measurement reporting condition, there is a low probability that the terminal device performs cell reselection or cell handover. For example, for a terminal device in a static state, a terminal device with a low moving speed, or a terminal device that moves only in a scope, a probability of performing cell reselection or cell handover is low. In this way, it is easy for such a terminal device to meet the first measurement reporting condition. Since the probability of performing cell reselection or cell handover is low, it indicates that the terminal device does not need to perform excessive measurement of the serving cell. Therefore, it may be considered that the terminal device meets a relaxed measurement condition of the serving cell.

If determining that the terminal device meets the first measurement reporting condition, the terminal device may send the first information to the network device. The first information is used to indicate that the terminal device meets the relaxed measurement condition of the serving cell. The first information may be used to indicate, in an implicit indication manner or an explicit indication manner, that the terminal device meets the relaxed measurement condition of the serving cell.

For example, the first information may include a measurement report. In this manner, it may be considered that the first information does not directly indicate that the terminal device meets the relaxed measurement condition of the serving cell. However, it may be deduced, based on content of the measurement report included in the first information, that the terminal device meets the relaxed measurement condition of the serving cell. Therefore, after receiving the measurement report, the network device may determine, based on the content of the measurement report included in the first information, that the terminal device meets the relaxed measurement condition of the serving cell. This manner may be considered as an implicit indication manner. Alternatively, the first information may indicate that reporting is performed when the first measurement reporting condition is met, and the network device can determine that a case in which the terminal device meets the first measurement reporting condition means that the terminal device meets the relaxed measurement condition of the serving cell. Therefore, the network device may indirectly determine, based on the first information, that the terminal device meets the relaxed measurement condition of the serving cell. This is equivalent to implicitly indicating, based on the first information, that the terminal device meets the relaxed measurement condition of the serving cell. Therefore, this manner is also an implicit indication manner. Alternatively, the first information may include first indication information, and the first indication information may be used to indicate that the terminal device meets the relaxed measurement condition of the serving cell. For example, the first indication information includes an ID of a measurement reporting event corresponding to the first measurement reporting condition, and the measurement reporting event is an event that the terminal device meets the relaxed measurement condition of the serving cell. The network device may determine, based on the first indication information, that the terminal device meets the relaxed measurement condition of the serving cell. This manner is an explicit indication manner. In addition, in this manner, the first information may include or not include a measurement report, or the first information may be included in a measurement report.

For example, the terminal device may have a relaxed measurement state of the serving cell and a normal measurement state of the serving cell. The relaxed measurement state of the serving cell and the normal measurement state of the serving cell may meet but are not limited to at least one of the following cases.

Case 1: a quantity of time domain resources used by the terminal device in the relaxed measurement state of the serving cell to measure the serving cell is less than or equal to a first quantity threshold, and a quantity of time domain resources used by the terminal device in the normal measurement state of the serving cell to measure the serving cell may be greater than the first quantity threshold.

Case 2: frequency on which the terminal device in the relaxed measurement state of the serving cell measures the serving cell is less than or equal to a first frequency threshold, and frequency on which the terminal device in the normal measurement state of the serving cell measures the serving cell may be greater than the first frequency threshold.

Case 3: a quantity of times of measuring the serving cell by the terminal device in the relaxed measurement state of the serving cell is less than or equal to a first times threshold, and a quantity of times of measuring the serving cell by the terminal device in the normal measurement state of the serving cell is greater than the first times threshold.

Case 4: a quantity of reference signals of the serving cell measured by the terminal device in the relaxed measurement state of the serving cell is less than or equal to a second quantity threshold, and a quantity of reference signals of the serving cell measured by the terminal device in the normal measurement state of the serving cell is greater than the second quantity threshold.

Case 5: the terminal device in the relaxed measurement state of the serving cell does not measure the serving cell, and the terminal device in the normal measurement state of the serving cell needs to measure the serving cell.

The reference signal, for example, an SSB or a CSI-RS, has a plurality of sending opportunities in a time domain periodicity. The SSB is used as an example, each SSB may have a corresponding number, and the SSB may correspond to a beam. Therefore, that the quantity of reference signals measured by the terminal device is greater than or less than the second quantity threshold may be understood as follows: a quantity of beams measured by the terminal device is greater than or less than the second quantity threshold.

It may be considered that, in the relaxed measurement state of the serving cell, the terminal device sparsely measures the serving cell, or even may not measure the serving cell at all. In this way, power consumption of the terminal device can be reduced. For example, for a terminal device in a static state, a terminal device with a low moving speed, or a terminal device in an activity scope of a cell center, a probability of performing cell reselection or cell handover is low. Such a terminal device continuously measures the serving cell, but utilization of a measurement result is not high. Therefore, it may be considered that the measurement process is unnecessary and causes high power consumption of the terminal device. Such a terminal device may enter the relaxed measurement state of the serving cell, so that measurement of the serving cell is reduced, thereby reducing power consumption of the terminal device. In the normal measurement state of the serving cell, the terminal device may normally measure the serving cell. For example, for a terminal device in a high-speed moving state, a terminal device with a large moving scope, or a terminal device at a cell edge, a probability of performing cell reselection or cell handover is high. Such a terminal device needs to continuously measure the serving cell. Therefore, such a terminal device may be in the normal measurement state of the serving cell, keep measuring the serving cell, and obtain a measurement result in a timely manner, to perform a process such as cell reselection or cell handover.

S43: the network device sends second information to the terminal device, and the terminal device receives the second information from the network device, where the second information is used to indicate to enter the relaxed measurement state of the serving cell.

After receiving the first information, the network device may determine whether the terminal device can enter the relaxed measurement state of the serving cell. If the network device determines that the terminal device can enter the relaxed measurement state of the serving cell, the network device may send the second information to the terminal device, to indicate the terminal device to enter the relaxed measurement state of the serving cell. In embodiments of this application, the network device may determine whether the terminal device enters the relaxed measurement state of the serving cell, so that the network device and the terminal device have consistent perception of the status of the terminal device, and the network device can better control behavior of the terminal device.

For example, the network device may send the second information based on an RRC connection reconfiguration message, may send the second information based on a media access control control element (MAC CE), or may send the second information based on downlink control information (DCI).

S44: the terminal device enters the relaxed measurement state of the serving cell.

After receiving the second information, the terminal device may enter the relaxed measurement state of the serving cell. In the relaxed measurement state of the serving cell, measurement of the serving cell is sparse, so that power consumption of the terminal device can be reduced. S44 is merely an optional step, and is not necessarily performed. Therefore, S44 is represented by a dashed line in FIG. 4.

S45: the terminal device determines that a second measurement reporting condition is met.

For example, the second measurement reporting condition may be configured by the network device for the terminal device, may be determined by the terminal device, or may be specified in a protocol. For example, the second measurement reporting condition includes that a measurement result (or signal quality of the serving cell, or received signal strength of the serving cell for the terminal device) obtained by measuring the serving cell meets a second threshold, or the second measurement reporting condition includes that a measurement result (or signal quality of a serving cell, or received signal strength of the serving cell for the terminal device) obtained by measuring the serving cell meets a second threshold within second duration. The terminal device may measure the serving cell, and the obtained measurement result may be used for determining of the first measurement reporting condition. For example, the obtained measurement result may represent the signal quality of the serving cell, or represent the received signal strength of the serving cell for the terminal device. If the second measurement reporting condition includes that the signal quality of the serving cell meets the second threshold within the second duration, it means that the measurement result of the serving cell always meets the second threshold within the second duration. The second duration may be configured by the network device for the terminal device, may be determined by the terminal device, may be specified in a protocol, or the like. If the terminal device meets the second measurement reporting condition, it indicates that the signal quality of the serving cell measured by the terminal device and/or the signal strength of the serving cell for the terminal device meet/meets a threshold, it may indicate that the terminal device is located near a cell edge, or that the signal quality of the serving cell measured by the terminal device and/or the signal strength of the serving cell for the terminal device fluctuates greatly, and it may indicate that mobility of the terminal device is strong (where for example, the terminal device moves in a large scope, or the terminal device moves fast). There is a high probability that such a terminal device performs cell reselection or cell handover.

For example, that the signal quality of the serving cell meets the second threshold may include: a measurement result (where for example, the measurement result is RSRP, RSRQ, or an SINR, and the measurement result may also be referred to as a measurement value in this case) obtained by the terminal device by measuring the serving cell within fifth duration meets the second threshold. For example, that a measurement result obtained by the terminal device by measuring the serving cell within fifth duration meets the second threshold may mean that N measurement results obtained by the terminal device by measuring the serving cell within the fifth duration meet the second threshold, and the N measurement results may be all or a part of measurement results obtained by the terminal device within the fifth duration. Alternatively, there may be no concept of fifth duration, and that the signal quality of the serving cell meets the second threshold may include: N measurement results (or referred to as measurement values) obtained by the terminal device by measuring the serving cell meet the second threshold. In this case, the N measurement results may be understood as a set of N measurement results. N may be an integer greater than or equal to 1.

If N is greater than 1, the N measurement results may be N measurement results corresponding to N times of continuous measurement, or the N times of measurement corresponding to the N measurement results may not be continuously performed. If N is greater than 1, in an example, that a measurement result obtained by the terminal device by measuring the serving cell within fifth duration meets the second threshold may include Implementation 3. For example, in Implementation 3, a difference (a variance, or the like) between every K adjacent measurement values of the N measurement values is greater than or equal to a third sub-threshold. Alternatively, for example, in Implementation 3, a sum (or a difference) of a difference (a variance, or the like) between every K adjacent measurement values and a third hysteresis parameter is greater than or equal to a third sub-threshold. Alternatively, for example, in Implementation 3, a difference (a variance, or the like) between any K measurement values of the N measurement values is greater than or equal to a third sub-threshold. Alternatively, for example, in Implementation 3, a sum (or a difference) of a difference (a variance, or the like) between any K measurement values of the N measurement values and a third hysteresis parameter is greater than or equal to a third sub-threshold. In Implementation 3, the second threshold is the third sub-threshold, and that a parameter meets the second threshold means that a value of the parameter is greater than or equal to the second threshold. K is an integer greater than or equal to 2, and K is less than or equal to N. For another example, that a measurement result obtained by the terminal device by measuring the serving cell within fifth duration meets the second threshold may include Implementation 4. For example, in Implementation 4, the N measurement values and a second reference value (or may be referred to as a fourth hysteresis parameter) meet the second threshold. In this case, N may be equal to 1 or may be greater than 1. Implementation 4 may be implemented as follows: a difference between each of the N measurement values and the second reference value is less than or equal to a fourth sub-threshold. Alternatively, a difference between each of the N measurement values and the second reference value is less than or equal to a fourth sub-threshold. In Implementation 4, the second threshold is the fourth sub-threshold, and that a parameter meets the second threshold means that a value of the parameter is less than or equal to the second threshold. That a measurement result obtained by the terminal device by measuring the serving cell within fifth duration meets the second threshold may include Implementation 3, may include Implementation 4, or may include Implementation 3 and Implementation 4. In addition, a value of the third hysteresis parameter may be greater than 0, less than 0, or equal to 0. If the value of the third hysteresis parameter is equal to 0, it may also be considered that the third hysteresis parameter does not exist, in other words, the third hysteresis parameter does not exist in Implementation 3. A value of the fourth hysteresis parameter may be greater than 0, less than 0, or equal to 0. If the value of the fourth hysteresis parameter is equal to 0, it may also be considered that the fourth hysteresis parameter does not exist, in other words, the fourth hysteresis parameter does not exist in Implementation 4.

For example, the second reference value may be configured by the network device for the terminal device, may be determined by the terminal device, or may be specified in a protocol. The third sub-threshold may be equal to or unequal to the fourth sub-threshold. If the third sub-threshold is unequal to the fourth sub-threshold, the first sub-threshold may be greater than the fourth sub-threshold, or the third sub-threshold may be less than the fourth sub-threshold. The third sub-threshold may be greater than the first sub-threshold, less than the first sub-threshold, or equal to the first sub-threshold. The fourth sub-threshold may be greater than the second sub-threshold, less than the second sub-threshold, or equal to the second sub-threshold.

For example, that a measurement result obtained by the terminal device by measuring the serving cell within fifth duration meets the second threshold includes only Implementation 3. Implementation 3 is as follows: in the N measurement values, a difference of a difference between every two adjacent measurement values and the second hysteresis parameter is greater than or equal to the third sub-threshold, where N=4. The terminal device performs four times of consecutive measurement of the serving cell, and the four times of measurement may be performed continuously or non-continuously. A measurement value of the first measurement is a measurement value 1, a measurement value of the second measurement is a measurement value 2, a measurement value of the third measurement is a measurement value 3, and a measurement value of the fourth measurement is a measurement value 4. If a difference (for example, referred to as a difference 1) between the second hysteresis parameter and a difference between the measurement value 1 and the measurement value 2 is greater than or equal to the third sub-threshold, a difference (for example, referred to as a difference 2) between the second hysteresis parameter and a difference between the measurement value 2 and the measurement value 3 is greater than or equal to the third sub-threshold, and a difference (for example, referred to as a difference 3) between the second hysteresis parameter and a difference between the measurement value 3 and the measurement value 4 is greater than or equal to the third sub-threshold, the terminal device may determine that the measurement result obtained by the terminal device by measuring the serving cell within the fifth duration meets the second threshold. Provided that the difference between the second hysteresis parameter and one of the difference 1, the difference 2, and the difference 3 is less than the third sub-threshold, the terminal device may determine that the measurement result obtained by the terminal device by measuring the serving cell within the fifth duration does not meet the second threshold. Whether the measurement result obtained by the terminal device by measuring the serving cell within the fifth duration meets the second threshold is determined based on the differences between the measurement values in consecutive measurement, and a plurality of measurement results may be considered, so that a determined result better complies with a current status of the terminal device.

For another example, that a measurement result obtained by the terminal device by measuring the serving cell within fifth duration meets the second threshold includes only Implementation 4. Implementation 4 is that the difference between each of the N measurement values and the second reference value is less than or equal to the fourth sub-threshold, where N=3. For example, the terminal device performs three times of measurement of the serving cell, and the three times of measurement may be performed continuously or non-continuously. A measurement value of the first measurement is a measurement value 1, a measurement value of the second measurement is a measurement value 2, and a measurement value of the third measurement is a measurement value 3. If a difference between the measurement value 1 and the second reference value is less than or equal to the fourth sub-threshold, a difference between the measurement value 2 and the second reference value is less than or equal to the fourth sub-threshold, and a difference between the measurement value 3 and the second reference value is less than or equal to the fourth sub-threshold, the terminal device may determine that the measurement result obtained by the terminal device by measuring the serving cell within the fifth duration meets the second threshold. However, if one or more of the three differences are greater than the fourth sub-threshold, the terminal device may determine that the measurement result obtained by the terminal device by measuring the serving cell within the fifth duration does not meet the second threshold. The second reference value is used to determine whether the measurement result obtained by the terminal device by measuring the serving cell within the fifth duration meets the second threshold, so that a determining process is simple.

For another example, that a measurement result obtained by the terminal device by measuring the serving cell within fifth duration meets the second threshold includes Implementation 3 and Implementation 4. If the terminal device determines, in both Implementation 3 and Implementation 4, that the measurement result obtained by the terminal device by measuring the serving cell within the fifth duration meets the second threshold, the terminal device may consider that the measurement result meets the second threshold. If the terminal device determines, in Implementation 3, that the measurement result obtained by measuring the serving cell by the terminal device within the fifth duration does not meet the second threshold, or determines, in Implementation 4, that the measurement result obtained by measuring the serving cell by the terminal device within the fifth duration does not meet the second threshold, or determines, in both Implementation 3 and Implementation 4, that the measurement result obtained by measuring the serving cell by the terminal device within the fifth duration does not meet the second threshold, the terminal device may consider that the measurement result obtained by the terminal device by measuring the serving cell within the fifth duration does not meet the second threshold.

Certainly, provided that a corresponding implementation can indicate that there is a high probability that the terminal device performs cell reselection or cell handover, that a measurement result obtained by the terminal device by measuring the serving cell within fifth duration meets the second threshold may further include another implementation in addition to the foregoing implementations, or that a measurement result obtained by the terminal device by measuring the serving cell within fifth duration meets the second threshold may not include the foregoing implementations, but include another implementation.

The terminal device may continuously determine whether the terminal device meets the second measurement reporting condition. For example, if the terminal device continuously measures the serving cell, the terminal device may determine, based on the measurement value of the serving cell, whether the terminal device meets the second measurement reporting condition. Alternatively, the terminal device may periodically determine, based on the measurement result of the serving cell, whether the terminal device meets the second measurement reporting condition.

S46: the terminal device sends third information to the network device, and the network device receives the third information from the terminal device.

The third information may indicate that the relaxed measurement condition of the serving cell is not met, and the network device may determine, based on the third information, that the terminal device does not meet the relaxed measurement condition of the serving cell. Alternatively, the third information may indicate that a normal measurement condition of the serving cell is met, and the network device may determine, based on the third information, that the terminal device meets the normal measurement condition of the serving cell.

It may be considered that if the terminal device meets the second measurement reporting condition, there is a high probability that the terminal device performs cell reselection or cell handover. For example, for a terminal device in a high-speed moving state, a terminal device with a large moving scope, or a terminal device at a cell edge, a probability of performing cell reselection or cell handover is high. In this way, it is easy for such a terminal device to meet the second measurement reporting condition. Since the probability of performing cell reselection or cell handover is high, it indicates that the terminal device needs to perform normal measurement of the serving cell. Therefore, it may be considered that the terminal device meets the normal measurement condition of the serving cell, or does not meet the relaxed measurement condition of the serving cell.

If determining that the terminal device meets the second measurement reporting condition, the terminal device may send the third information to the network device. For example, the third information may indicate that the terminal device does not meet the relaxed measurement condition of the serving cell, or indicate that the terminal device meets the normal measurement condition of the serving cell. The third information may be used to indicate, in an implicit indication manner or an explicit indication manner, that the terminal device does not meet the relaxed measurement condition of the serving cell or meets the normal measurement condition of the serving cell.

For example, the third information indicates that the normal measurement condition of the serving cell is met, and the network device may determine, based on the third information, that the terminal device meets the normal measurement condition of the serving cell. For example, the third information may include a measurement report. In this manner, it may be considered that the third information does not directly indicate that the terminal device meets the normal measurement condition of the serving cell. However, it may be deduced, based on content of the measurement report included in the third information, that the terminal device meets the normal measurement condition of the serving cell. Therefore, after receiving the measurement report, the network device may determine, based on the content of the measurement report included in the third information, that the terminal device meets the normal measurement condition of the serving cell. This manner may be considered as an implicit indication manner. Alternatively, the third information may indicate that reporting is performed when the second measurement reporting condition is met, and the network device can determine that a case in which terminal device meets the second measurement reporting condition means that the terminal device meets the normal measurement condition of the serving cell. Therefore, the network device may indirectly determine, based on the third information, that the terminal device meets the normal measurement condition of the serving cell. This is equivalent to implicitly indicating, based on the third information, that the terminal device meets the normal measurement condition of the serving cell. Therefore, this manner is also an implicit indication manner. Alternatively, the third information may include second indication information, and the second indication information may be used to indicate that the terminal device meets the normal measurement condition of the serving cell. For example, the second indication information includes an ID of a measurement reporting event corresponding to the second measurement reporting condition, and the measurement reporting event is an event that the terminal device meets the normal measurement condition of the serving cell. The network device may determine, based on the second indication information, that the terminal device meets the normal measurement condition of the serving cell. This manner is an explicit indication manner. In addition, in this manner, the third information may include or not include a measurement report, or the third information may be included in a measurement report.

S47: the network device sends fourth information to the terminal device, and the terminal device receives the fourth information from the network device, where the fourth information is used to indicate to enter the normal measurement state of the serving cell.

After receiving the third information, the network device may determine whether the terminal device can enter the normal measurement state of the serving cell. If the network device determines that the terminal device can enter the normal measurement state of the serving cell, the network device may send the fourth information to the terminal device, to indicate the terminal device to enter the normal measurement state of the serving cell. In embodiments of this application, the network device may determine whether the terminal device enters the normal measurement state of the serving cell, so that the network device and the terminal device have consistent perception of the status of the terminal device, and the network device can better control behavior of the terminal device.

For example, the network device may send the fourth information based on an RRC connection reconfiguration message, may send the fourth information based on a MAC CE, or may send the fourth information based on DCI.

S48: the terminal device enters the normal measurement state of the serving cell.

After receiving the fourth information, the terminal device may enter the normal measurement state of the serving cell. In the normal measurement state of the serving cell, the terminal device performs intensive measurement of the serving cell, so that a large quantity of measurement results can be obtained, to meet a requirement on a task such as cell reselection or cell handover. S45 to S48 are only optional steps, and are not necessarily performed. Therefore, S45 to S48 are represented by dashed lines in FIG. 4.

S49: the terminal device determines to enter the normal measurement state of the serving cell after third duration.

S49 and S45 to S48 are in a parallel relationship. To be specific, after S44 is performed, S49 may be performed, or S45 to S48 may be performed. However, S49 and S45 to S48 are not both performed, and only one of S49 and S45 to S48 is performed. Certainly, S49 is also merely an optional step, and is not necessarily performed. Therefore, S49 is represented by a dashed line in FIG. 4.

The third duration may be configured by the network device for the terminal device, may be determined by the terminal device, may be specified in a protocol, or the like.

After staying in the relaxed measurement state of the serving cell for a period of time, the terminal device may re-enter the normal measurement state of the serving cell, to reduce a probability of missing a cell handover opportunity and reduce impact on cell handover. Therefore, after the third duration in which the terminal device enters the relaxed measurement state of the serving cell, the terminal device may automatically enter the normal measurement state of the serving cell, to normally measure the serving cell. In this manner, the terminal device can resume normal measurement of the serving cell without an indication of the network device. This helps reduce signaling overheads.

Alternatively, the terminal device may enter the normal measurement state of the serving cell from the relaxed measurement state of the serving cell in another manner. For example, it is assumed that the network device indicates, in any step (for example, based on an RRC connection reconfiguration message or second information) before S45, that the terminal device does not need to report to the network device and may directly resume the normal measurement state of the serving cell when determining that normal measurement needs to be performed on the serving cell, or it is assumed that without an indication of the network device, for example, as specified in a protocol, the terminal device does not need to report to the network device and may directly resume the normal measurement state of the serving cell when determining that normal measurement needs to be performed on the serving cell. In this case, if the terminal device determines that normal measurement needs to be performed on the serving cell, for example, the terminal device considers that cell handover needs to be performed, or the terminal device determines that the signal quality or the received signal strength is poor, the terminal device does not need to report to the network device, and does not need to wait for the third duration, but may directly resume the normal measurement state of the serving cell. This solution may coexist with the solution of S45 to S48, or may coexist with the solution of S49. Alternatively, this solution may be independently performed. To be specific, if this solution is performed, S45 to S49 are not performed.

In this solution, signaling overheads can be reduced, and a latency caused because the network device sends the fourth information can be reduced, or a latency caused because the terminal device waits for the third duration can be reduced, thereby ensuring time validity of cell handover.

In embodiments of this application, a terminal device may determine whether a first measurement reporting condition is met. If the first measurement reporting condition is met, it indicates that there is a low probability that the terminal device performs cell handover or reselection. For example, the terminal device may be located in a center of a serving cell, may have low mobility, or may have a small activity scope. For such a terminal device, frequent measurement of the serving cell is equivalent to an unnecessary measurement process, and causes high power consumption. Therefore, a network device may indicate such a terminal device to enter a relaxed measurement state of the serving cell, to reduce a measurement process of the serving cell, so as to save power.

Figure 5:
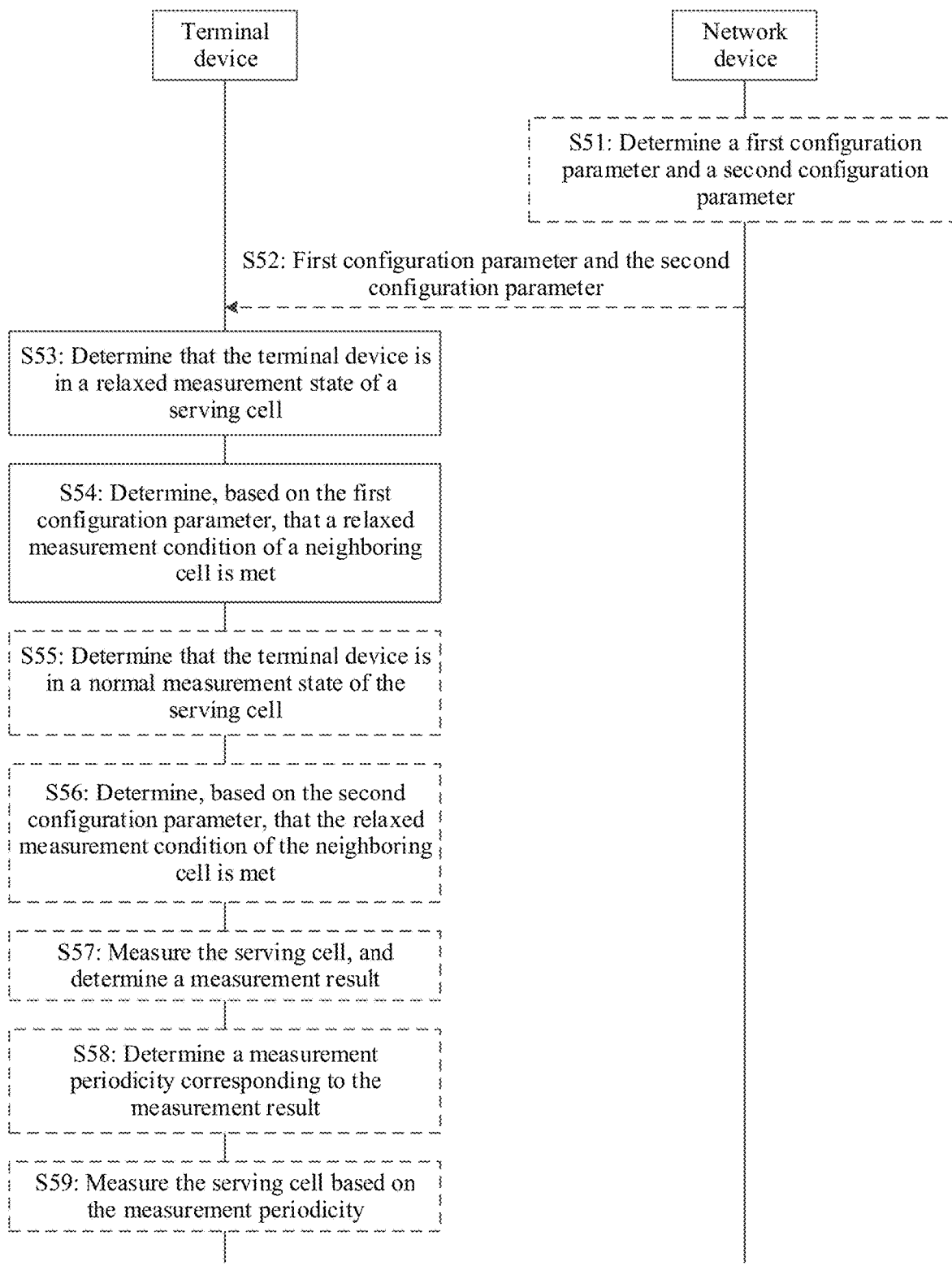
FIG. 5 is a flowchart of a second measurement method according to an embodiment of this application.

To resolve the same technical problem, an embodiment of this application provides a second measurement method. FIG. 5 is a flowchart of the method. The following provides descriptions by using an example in which the method is applied to the network architecture shown in FIG. 3.

For ease of description, the following uses an example in which the method is performed by a network device and a terminal device. For example, this embodiment is applied to the network architecture shown in FIG. 3. Therefore, the network device described below may be the network device in the network architecture shown in FIG. 3, and the terminal device described below may be the terminal device in the network architecture shown in FIG. 3.

S51: the network device determines a first configuration parameter and a second configuration parameter.

The first configuration parameter is used to determine, when the terminal device is in a relaxed measurement state of a serving cell, whether a relaxed measurement condition of a neighboring cell is met, the second configuration parameter is used to determine, when the terminal device is in a normal measurement state of the serving cell, whether the relaxed measurement condition of the neighboring cell is met, and the first configuration parameter is different from the second configuration parameter. In other words, when the terminal device is in the relaxed measurement state of the serving cell, the terminal device may determine, based on the first configuration parameter, whether the terminal device meets the relaxed measurement condition of the neighboring cell; when the terminal device is in the normal measurement state of the serving cell, the terminal device may determine, based on the second configuration parameter, whether the terminal device meets the relaxed measurement condition of the neighboring cell.

The terminal device may have two states: the relaxed measurement state of the serving cell and the normal measurement state of the serving cell. For descriptions of the two states, refer to the embodiment shown in FIG. 4.

In addition, the terminal device may further be in a relaxed measurement state of the neighboring cell. The relaxed measurement state of the neighboring cell may meet one or more of the following case 6, case 7, case 8, case 9, or case 10.

Case 6: in the relaxed measurement state of the neighboring cell, time domain resources used by the terminal device for measurement of the neighboring cell are correspondingly reduced.

Case 7: in the relaxed measurement state of the neighboring cell, the terminal device uses a longer time interval to measure the neighboring cell.

Case 8: in the relaxed measurement state of the neighboring cell, the terminal device may not measure the neighboring cell within a period of time.

Case 9: in the relaxed measurement state of the neighboring cell, frequency of measuring the neighboring cell by the terminal device may decrease.

Case 10: in the relaxed measurement state of the neighboring cell, a quantity of neighboring cells/carriers/reference signals (such as SSBs) measured by the terminal device is small. Similarly, a decrease in a quantity of reference signals measured by the terminal device is equivalent to a decrease in a quantity of measured beams.

When the terminal device is in the relaxed measurement state of the serving cell, the terminal device also determines whether the relaxed measurement condition of the neighboring cell is met. Therefore, when the terminal device is in the relaxed measurement state of the serving cell, the terminal device may also enter the relaxed measurement state of the neighboring cell. In this case, if the terminal device enters the relaxed measurement state of the neighboring cell when the terminal device is in the relaxed measurement state of the serving cell, frequency of measuring the neighboring cell by the terminal device may be correspondingly reduced, or the terminal device may not measure the neighboring cell. When the terminal device is in the relaxed measurement state of the neighboring cell, the terminal device may continue to determine, based on a measurement result of the serving cell, whether to stay in the relaxed measurement state of the neighboring cell. If the measurement result such as a cell reselection received signal level/cell reselection received signal strength (cell selection RX level value) of the serving cell indicates that the relaxed measurement condition of the neighboring cell is not met, the terminal device exits from the relaxed measurement state of the neighboring cell, and performs normal measurement of the neighboring cell. If the measurement result such as a cell reselection received signal level/cell reselection received signal strength of the serving cell indicates that the relaxed measurement condition of the neighboring cell is met, the terminal stays in the relaxed measurement state of the neighboring cell. If the terminal device is in the relaxed measurement state of the serving cell, the terminal obtains a small quantity of measurement results of the serving cell. In this way, determining of the relaxed measurement condition of the neighboring cell is affected. For example, consequently, the terminal device cannot exit from the relaxed measurement state of the neighboring cell in a timely manner. The terminal device obtains a small quantity of measurement results of the neighboring cell in the relaxed measurement state of the neighboring cell. Consequently, the terminal device may miss an occasion for performing cell reselection, and cannot perform reselection to an appropriate cell in a timely manner. Therefore, in embodiments of this application, the network device may configure two sets of parameters, namely, the first configuration parameter and the second configuration parameter, for the terminal device. The first configuration parameter is used by the terminal device in the relaxed measurement state of the serving cell to determine whether the relaxed measurement condition of the neighboring cell is met. The second configuration parameter is used by the terminal device in the normal measurement state of the serving cell to determine whether the relaxed measurement condition of the neighboring cell is met. If the terminal device in the relaxed measurement state of the serving cell enters the relaxed measurement state of the neighboring cell, the terminal device can exit, based on the first configuration parameter, from the relaxed measurement state of the neighboring cell as easily as possible. This ensures measurement of the neighboring cell, so that the terminal device can perform reselection to an appropriate cell in a timely manner.

The configuration parameter includes, for example, $T_{SearchDeltap}$, $S_{SearchDeltaP}$, or $T_{SearchDeltap}$ and $S_{SearchDeltaP}$ described above. The first configuration parameter and the second configuration parameter may include same parameters (whose values may be the same or may be different), or may include different parameters. For example, both the first configuration parameter and the second configuration parameter include $T_{SearchDeltaP}$ and $S_{SearchDeltaP}$; the first configuration parameter includes $T_{SearchDeltaP}$, and the second configuration parameter includes $S_{SearchDeltaP}$; or the first configuration parameter includes $T_{SearchDeltaP}$ and $S_{SearchDeltaP}$, and the second configuration parameter includes $S_{SearchDeltaP}$.

For example, both the first configuration parameter and the second configuration parameter include $T_{SearchDeltap}$ and $S_{SearchDeltaP}$. For example, $T_{SearchDeltaP}$ included in the first configuration parameter is referred to as $T_{SearchDeltaPrelax}$, $S_{SearchDeltaP}$ included in the first configuration parameter is referred to as $S_{SearchDeltaPrelax}$, $T_{SearchDeltaP}$ included in the second configuration parameter is referred to as $T_{SearchDeltaPnormal}$, and $S_{SearchDeltaP}$ included in the second configuration parameter is referred to as $S_{SearchDeltaPnormal}$.

For example, $T_{SearchDeltaPnormal}$ may be equal to $T_{SearchDeltaP}$ that is currently used by a terminal device to determine whether a relaxed measurement condition of a neighboring cell is met in an LTE system, and $S_{SearchDeltaPnormal}$ may be equal to $S_{SearchDeltaP}$ that is currently used by the terminal device to determine whether the relaxed measurement condition of the neighboring cell is met in the LTE system. That is, the second configuration parameter may still be an existing parameter used to determine whether the relaxed measurement condition of the neighboring cell is met. For another example, $T_{SearchDeltaPrelax}$ may be greater than $T_{SearchDeltaPnormal}$; $S_{SearchDeltaPrelax}$ may be less than $S_{SearchDeltaPnormal}$, or $T_{SearchDeltaPrelax}$ may be greater than $T_{SearchDeltaPnormal}$, and $S_{SearchDeltaPrelax}$ may be less than $S_{SearchDeltaPnormal}$. In the foregoing three cases, the terminal device in the relaxed measurement state of the serving cell and the relaxed measurement state of the neighboring cell can exit from the relaxed measurement state of the neighboring cell as easily as possible, and measurement of the neighboring cell performed by the terminal device is ensured as much as possible when cell reselection may be performed, to reduce impact on cell reselection.

Certainly, if the first configuration parameter includes $T_{SearchDeltaPrelax}$, and the second configuration parameter includes $T_{SearchDeltaPnormal}$, a value relationship between $T_{SearchDeltaPrelax}$ and $T_{SearchDeltaPnormal}$ is not limited to the cases described above. If the first configuration parameter includes $S_{SearchDeltaPrelax}$, and the second configuration parameter includes $S_{SearchDeltaPnormal}$, a value relationship between $S_{SearchDeltaPrelax}$ and $S_{SearchDeltaPnormal}$ is not limited to the cases described above. These are not limited provided that the first configuration parameter can be used to enable the terminal device in the relaxed measurement state of the neighboring cell and the relaxed measurement state of the serving cell to exit from the relaxed measurement state of the neighboring cell as easily as possible.

S52: the network device sends the first configuration parameter and the second configuration parameter to the terminal device, and the terminal device receives the first configuration parameter and the second configuration parameter from the network device.

The first configuration parameter and the second configuration parameter may be included in one message, for example, may be included in two fields of one message. Alternatively, the first configuration parameter and the second configuration parameter may be included in two messages. If the first configuration parameter and the second configuration parameter are included in two messages, the network device may first send the first configuration parameter and then send the second configuration parameter, or may first send the second configuration parameter and then send the first configuration parameter, or may simultaneously send the first configuration parameter and the second configuration parameter.

In addition, when sending the first configuration parameter, the network device may also indicate that the first configuration parameter is used by the terminal device in the relaxed measurement state of the serving cell to determine whether the relaxed measurement condition of the neighboring cell is met. When sending the second configuration parameter, the network device may also indicate that the second configuration parameter is used by the terminal device in the normal measurement state of the serving cell to determine whether the relaxed measurement condition of the neighboring cell is met. In this way, after receiving the first configuration parameter, the terminal device may determine that the first configuration parameter is used by the terminal device in the relaxed measurement state of the serving cell to determine whether the relaxed measurement condition of the neighboring cell is met. After receiving the second configuration parameter, the terminal device may determine that the second configuration parameter is used by the terminal device in the normal measurement state of the serving cell to determine whether the relaxed measurement condition of the neighboring cell is met.

In S51 and S52, an example in which the network device configures the first configuration parameter and the second configuration parameter for the terminal device is used. Alternatively, the first configuration parameter and the second configuration parameter may not be configured by the network device. For example, the first configuration parameter and the second configuration parameter may be preconfigured in the terminal device, or may be specified in a protocol. In this way, the network device does not need to determine the first configuration parameter and the second configuration parameter, and does not need to send the first configuration parameter and the second configuration parameter to the terminal device. In this case, S51 and S52 do not need to be performed, to reduce signaling overheads. It can be learned that S51 and S52 are only optional steps, and are not necessarily performed. Therefore, S51 and S52 are represented by dashed lines in FIG. 5.

S53: the terminal device determines that the terminal device is in the relaxed measurement state of the serving cell, or the terminal device determines that the terminal device meets a relaxed measurement condition of the serving cell.

For example, the relaxed measurement condition of the serving cell is as follows. The terminal device sets a reference value and a threshold. Within a period of time, if a difference between a measurement result (where for example, the measurement result may be RSRP, RSRQ, or an SINR, or the measurement result may be referred to as a measurement value) of the serving cell for the terminal device and the reference value is less than or equal to the threshold, the terminal device determines that the terminal device is in the relaxed measurement state of the serving cell. Otherwise, the terminal device determines that the terminal device is in the normal measurement state of the serving cell, or determines that the terminal device is not in the relaxed measurement state of the serving cell. Alternatively, the reference value and the threshold may be delivered by the network device to the terminal device.

Alternatively, the terminal device may determine, by using the method provided in the embodiment shown in FIG. 4, that the terminal device is in the relaxed measurement state of the serving cell. For example, if the terminal device determines that the terminal device meets a first measurement reporting condition, it may be considered that the terminal device meets the relaxed measurement condition of the serving cell, or it may be considered that the terminal device enters the relaxed measurement state of the serving cell. From time when the terminal device enters the relaxed measurement state of the serving cell to time when the terminal device exits from the relaxed measurement state, the terminal device may determine that the terminal device is in the relaxed measurement state of the serving cell. Alternatively, from time when the terminal device determines that the terminal device meets the first measurement reporting condition to time when the terminal device exits from the relaxed measurement state of the serving cell, the terminal device may determine that the terminal device is in the relaxed measurement state of the serving cell. For content such as how the terminal device determines whether the first measurement reporting condition is met, and descriptions of the relaxed measurement state of the serving cell and the normal measurement state of the serving cell, refer to the descriptions in the embodiment shown in FIG. 4.

S54: the terminal device determines, based on the first configuration parameter, that the relaxed measurement condition of the neighboring cell is met. For example, the terminal device determines, based on the first configuration parameter, whether the relaxed measurement condition of the neighboring cell is met. An example in which the terminal device determines that the relaxed measurement condition of the neighboring cell is met is used in S54.

The first configuration parameter and the second configuration parameter are configured for the terminal device. If the terminal device is in the relaxed measurement state of the serving cell, the terminal device may determine, by using the first configuration parameter, whether the terminal device meets the relaxed measurement condition of the neighboring cell.

For example, when the following conditions are met, the terminal device may determine that the terminal device meets the relaxed measurement condition of the neighboring cell: a relaxed monitoring criterion is met within first duration, less than fourth duration has passed since measurement for cell reselection is last performed; and measurement of the neighboring cell has been performed within at least the first duration after a new cell is selected or reselected. That a relaxed monitoring criterion is met within first duration may be understood as follows: the relaxed monitoring criterion is always met within the first duration. For example, the terminal device may determine, for a plurality of times within the first duration, whether the relaxed monitoring criterion is met, and each determining result within the first duration indicates that the relaxed monitoring criterion is met; or the terminal device may determine, once within the first duration, whether the relaxed monitoring criterion is met, and a determining result indicates that the relaxed monitoring criterion is met. That less than fourth duration has passed since measurement for cell reselection is last performed may be understood as follows: duration between current time and time when a measurement process for cell reselection is performed last time is less than the fourth duration. The fourth duration is, for example, 24 hours, or may be another value. That measurement of the neighboring cell has been performed within at least the first duration after a new cell is selected or reselected may be understood as follows: measurement of the neighboring cell has been performed within third duration after the new cell is accessed through cell reselection or cell selection, where the third duration is greater than or equal to the first duration.

The first configuration parameter may include information about the first duration, and the first duration is, for example, $T_{SearchDeltaPrelax}$ described above. In addition, the first configuration parameter may further include a first threshold, and the first threshold, a reference value, and current signal quality of the serving cell may be used to determine whether the relaxed monitoring criterion is met. For example, the relaxed monitoring criterion may meet the foregoing Formula 1. $S_{SearchDeltaP}$ in Formula 1 may be replaced with $S_{SearchDeltaPrelax}$; and $S_{SearchDeltaPrelax}$: indicates the first threshold.

For more descriptions of the case in which the terminal device determines whether the terminal device meets the relaxed measurement condition of the neighboring cell, refer to the foregoing descriptions.

The LTE system is used as an example. The terminal device may determine, based on information included in an s-MeasureConfig information element in an RRC connection reconfiguration message, whether the neighboring cell needs to be measured. If the neighboring cell needs to be measured, the terminal device measures the neighboring cell. If the neighboring cell does not need to be measured, the terminal device does not measure the neighboring cell. Alternatively, if the terminal device determines that the terminal device meets the relaxed measurement condition of the neighboring cell, the terminal device may enter the relaxed measurement state of the neighboring cell. In the relaxed measurement state of the neighboring cell, the terminal device may not measure the neighboring cell, or may measure the neighboring cell on low frequency.

S55: the terminal device determines that the terminal device is in the normal measurement state of the serving cell, or the terminal device determines that the terminal device does not meet the relaxed measurement condition of the serving cell.

For example, the terminal device may set a reference value and a threshold. Within a period of time, if a difference between a measurement result (where for example, the measurement result may be RSRP, RSRQ, or an SINR, or the measurement result may be referred to as a measurement value) of the serving cell for the terminal device and the reference value is greater than the threshold, the terminal device determines that the terminal device is in the normal measurement state of the serving cell; otherwise, the terminal device determines that the terminal device is in the relaxed measurement state of the serving cell, or determines that the terminal device is not in the normal measurement state of the serving cell. The reference value herein and the reference value described in S53 may be the same reference value or different reference values, and the threshold herein and the threshold described in S53 may be the same threshold or different thresholds.

Alternatively, the terminal device may determine, by using the method provided in the embodiment shown in FIG. 4, that the terminal device is in the normal measurement state of the serving cell. For example, if the terminal device determines that the terminal device meets a second measurement reporting condition, it may be considered that the terminal device does not meet the relaxed measurement condition of the serving cell, or it may be considered that the terminal device enters the normal measurement state of the serving cell. From time when the terminal device enters the normal measurement state of the serving cell to time when the terminal device exits from the normal measurement state of the serving cell, the terminal device may determine that the terminal device is in the normal measurement state of the serving cell. Alternatively, from time when the terminal device determines that the terminal device meets the second measurement reporting condition to time when the terminal device exits from the normal measurement state of the serving cell, the terminal device may determine that the terminal device is in the normal measurement state of the serving cell. For content such as how the terminal device determines whether the second measurement reporting condition is met, and descriptions of the measurement state of the serving cell and the normal measurement state of the serving cell, refer to the descriptions in the embodiment shown in FIG. 4.

S56: the terminal device determines, based on the second configuration parameter, that the relaxed measurement condition of the neighboring cell is met. For example, the terminal device determines, based on the second configuration parameter, whether the relaxed measurement condition of the neighboring cell is met. An example in which the terminal device determines that the relaxed measurement condition of the neighboring cell is met is used in S56.

If the terminal device is in the normal measurement state of the serving cell, the terminal device may determine, by using the second configuration parameter, whether the terminal device meets the relaxed measurement condition of the neighboring cell.

For example, when the following conditions are met, the terminal device may determine that the terminal device meets the relaxed measurement condition of the neighboring cell: a relaxed monitoring criterion is met within second duration, less than 24 hours have passed since measurement for cell reselection is last performed; and measurement of the neighboring cell has been performed within at least the second duration after a new cell is selected or reselected. For explanations of these conditions, refer to the foregoing descriptions.

The second configuration parameter may include information about the second duration, and the second duration is, for example, $T_{SearchDeltaPnormal}$ described above. In addition, the second configuration parameter may further include a second threshold, and the second threshold, the reference value, and the current signal quality of the serving cell may be used to determine whether the relaxed monitoring criterion is met. For example, the relaxed monitoring criterion may meet the foregoing Formula 1. $S_{SearchDeltaP}$ in Formula 1 may be replaced with $S_{SearchDeltaPnormal}$, and $S_{SearchDeltaPnormal}$ indicates the second threshold.

The relaxed monitoring criterion may meet the foregoing Formula 1. $S_{SearchDeltaP}$ in Formula 1 may be replaced with $S_{SearchDeltaPnormal}$.

For more descriptions of the case in which the terminal device determines whether the terminal device meets the relaxed measurement condition of the neighboring cell, refer to the foregoing descriptions.

In embodiments of this application, the terminal device may use two sets of parameters, namely, the first configuration parameter and the second configuration parameter, to determine whether the relaxed measurement condition of the neighboring cell is met. The first configuration parameter is used by the terminal device in the relaxed measurement state of the serving cell to determine whether the relaxed measurement condition of the neighboring cell is met. The second configuration parameter is used by the terminal device to determine, in the normal measurement state of the serving cell, whether the relaxed measurement condition of the neighboring cell is met. The first configuration parameter may be used to enable the terminal device in the relaxed measurement state of the neighboring cell and the relaxed measurement state of the serving cell to exit from the relaxed measurement state of the neighboring cell as easily as possible. This ensures measurement of the neighboring cell as much as possible, so that the terminal device can perform reselection to an appropriate cell in a timely manner.

Both S55 and S56 are merely optional steps, and are not necessarily performed. Therefore, S55 and S56 are represented by dashed lines in FIG. 5.

S57: the terminal device measures the serving cell, and determines the measurement result. The measurement result may be used to represent received signal strength of the serving cell for the terminal device (or described as signal strength of the serving cell received by the terminal device, namely, signal strength of a signal received by the terminal device from the serving cell) and/or signal quality of the serving cell.

In this case, the terminal device may be in the relaxed measurement state of the serving cell or the normal measurement state of the serving cell. If the terminal device is in the relaxed measurement state of the serving cell, the terminal device is required to continue measuring the serving cell when the terminal device is in the relaxed measurement state of the serving cell. In other words, if it is specified that the terminal device does not measure the serving cell when the terminal device is in the relaxed measurement state of the serving cell, S57 and subsequent steps do not need to be performed. It may also be learned that S57 and S58 and S59 that are described below are only optional steps, and are not necessarily performed. Therefore, S57, S58, and S59 are represented by dashed lines in FIG. 5. In addition, S57 to S59 may occur before or after any step in the embodiment shown in FIG. 5, in other words, an occasion of S57 to S59 is not limited.

The measurement result is, for example, one or more of RSRP, RSRQ, or an SINR.

S58: the terminal device determines a measurement periodicity corresponding to the measurement result.

For example, a correspondence between a measurement result and a measurement periodicity may be established in advance. For example, a correspondence between RSRP and a measurement periodicity is established in advance, a correspondence between RSRQ and a measurement periodicity is established in advance, or a correspondence between an SINR and a measurement periodicity is established in advance. The correspondence may be established by the network device, and the network device may send the correspondence to the terminal device. Alternatively, the correspondence may be established by the terminal device, and the terminal device may send the correspondence to the network device after establishing the correspondence. Alternatively, the correspondence may be preconfigured in the terminal device, specified in a protocol, or the like. For example, a larger value of the measurement result indicates a longer length of the corresponding measurement periodicity, or a smaller value of the measurement result indicates a shorter length of the corresponding measurement periodicity. The measurement result may be used to represent the signal quality of the serving cell and/or the received signal strength of the serving cell for the terminal device. For example, better signal quality of the serving cell and/or better received signal strength of the serving cell for the terminal device indicate/indicates a larger value of the measurement result, or poorer signal quality of the serving cell and/or poorer received signal strength of the serving cell for the terminal device indicate/indicates a smaller value of the measurement result. Therefore, it may also be considered that better signal quality of the serving cell and/or better received signal strength of the serving cell for the terminal device indicate/indicates a longer length of the corresponding measurement periodicity, or poorer signal quality of the serving cell and/or poorer received signal strength of the serving cell for the terminal device indicate/indicates a shorter length of the corresponding measurement periodicity.

Figure 6:
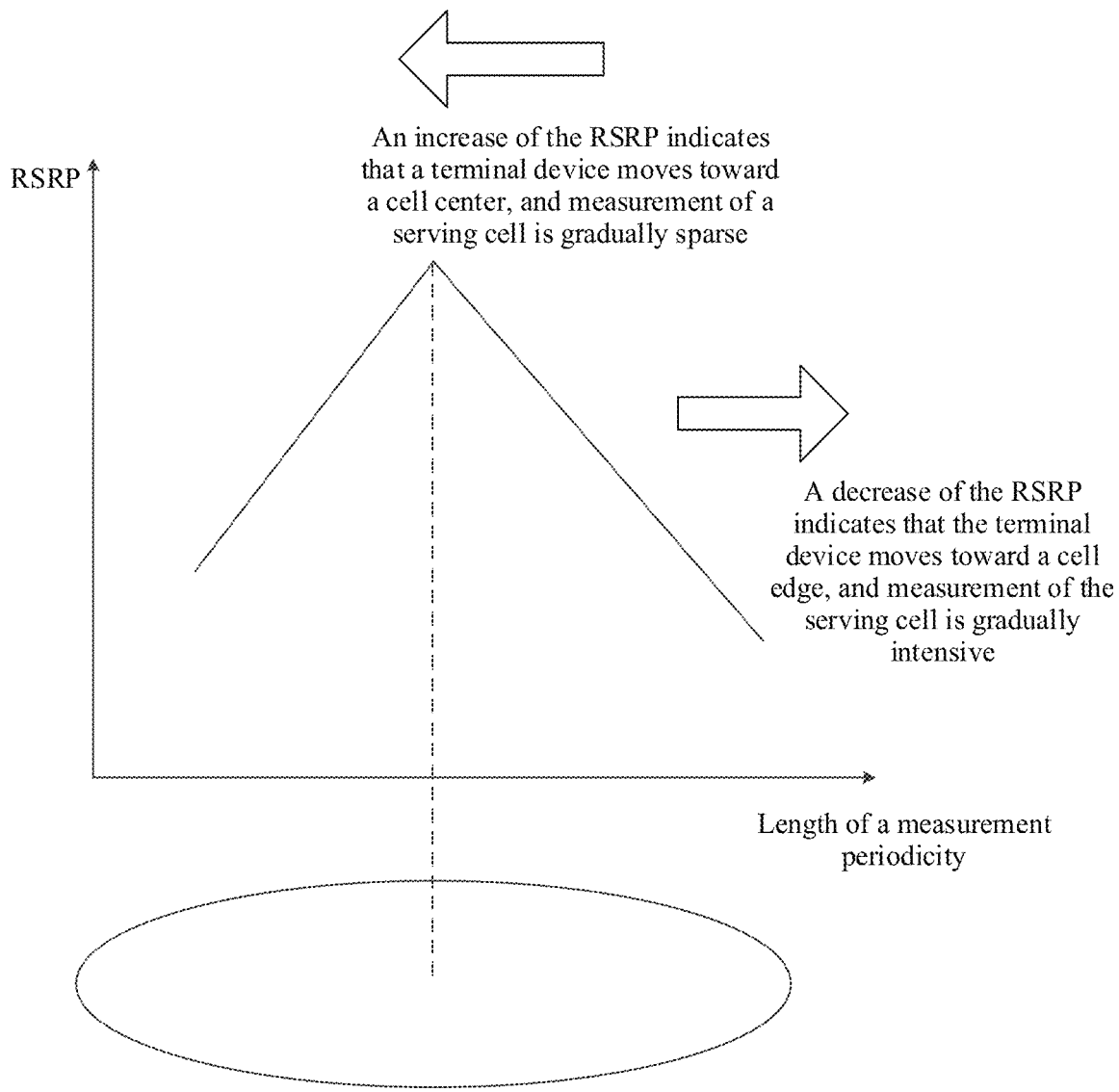
FIG. 6 is a schematic diagram of a correspondence between RSRP and a measurement periodicity according to an embodiment of this application.

An example is used in which the correspondence between RSRP and a measurement periodicity is established. For example, a larger value of the RSRP indicates a longer length of the corresponding measurement periodicity, or a smaller value of the RSRP indicates a shorter length of the corresponding measurement periodicity. Refer to FIG. 6. It can be learned that, an increase of the RSRP may indicate that the terminal device moves toward a center location of the serving cell. In this case, a probability that the terminal device performs cell reselection or handover is low, and therefore the terminal device does not need to excessively measure the serving cell. In this case, a length of the measurement periodicity may gradually increase, so that the terminal device sparsely measures the serving cell. A decrease of the RSRP may indicate that the terminal device moves toward an edge location of the serving cell. In this case, a probability that the terminal device performs cell reselection or handover is high, and the terminal device needs to measure the serving cell. Therefore, a length of the measurement periodicity may gradually decrease, so that the terminal device tends to frequently measure the serving cell.

Certainly, a relationship between a value of a measurement result and a length of a measurement periodicity is not limited thereto. When the measurement result is a different parameter, the relationship between a value of a measurement result and a length of a measurement periodicity may change.

S59: the terminal device measures the serving cell of the terminal device based on the measurement periodicity.

After determining the corresponding measurement periodicity based on the correspondence between a measurement result and a measurement periodicity and the obtained measurement result, the terminal device may measure the serving cell of the terminal device based on the measurement periodicity. The measurement periodicity is determined based on the measurement result of the terminal device, and conforms to a current state of the terminal device, so that measurement of the serving cell performed by the terminal device can meet a requirement of the terminal device, and energy saving can be implemented as much as possible.

The correspondence between a measurement result and a measurement periodicity may be applied only when the terminal device is in the relaxed measurement state of the serving cell. Certainly, a prerequisite is that frequency on which the terminal device in the relaxed measurement state of the serving cell measures the network device needs to be greater than 0, in other words, the terminal device in the relaxed measurement state of the serving cell needs to continue measuring the serving cell. Alternatively, the correspondence between a measurement result and a measurement periodicity may be applied when the terminal device is in the relaxed measurement state of the serving cell, or may be applied when the terminal device is in the normal measurement state of the serving cell. In this case, it is considered that there is a correspondence between a measurement periodicity and a measurement result. However, for the terminal device, there may be no clear boundary between the relaxed measurement state of the serving cell and the normal measurement state of the serving cell, and the relaxed measurement state of the serving cell and the normal measurement state of the serving cell are merely relative concepts.

In embodiments of this application, the relaxed measurement state of the serving cell is set for the terminal device, to reduce power consumption of the terminal device. In addition, when the terminal device is in the relaxed measurement state of the serving cell, the terminal device may also enter the relaxed measurement state of the neighboring cell, and frequency of measurement of the neighboring cell performed by the terminal device may also be correspondingly reduced. When the terminal device is in the relaxed measurement state of the neighboring cell, the terminal device may continue to determine whether to stay in the relaxed measurement state of the neighboring cell. If the relaxed measurement condition of the neighboring cell is not met, the terminal device exits from the relaxed measurement state of the neighboring cell, and performs normal measurement of the neighboring cell. If the relaxed measurement condition of the neighboring cell is met, the terminal device continues to stay in the relaxed measurement state of the neighboring cell. If the terminal device is in the relaxed measurement state of the serving cell, the terminal obtains a small quantity of measurement results of the serving cell. In this way, determining of the relaxed measurement condition of the neighboring cell is affected. For example, consequently, the terminal device cannot exit from the relaxed measurement state of the neighboring cell in a timely manner. The terminal device obtains a small quantity of measurement results of the neighboring cell in the relaxed measurement state of the neighboring cell. Consequently, the terminal device may miss an occasion for performing cell reselection, and cannot perform reselection to an appropriate cell in a timely manner. Therefore, in embodiments of this application, the network device may configure two sets of parameters, namely, the first configuration parameter and the second configuration parameter, for the terminal device. The first configuration parameter is used by the terminal device in the relaxed measurement state of the serving cell to determine whether the relaxed measurement condition of the neighboring cell is met. The second configuration parameter is used by the terminal device in the normal measurement state of the serving cell to determine whether the relaxed measurement condition of the neighboring cell is met. The terminal device in the relaxed measurement state of the serving cell and the relaxed measurement state of the neighboring cell can exit, based on the first configuration parameter, from the relaxed measurement state of the neighboring cell as easily as possible. This ensures measurement of the neighboring cell, so that the terminal device can perform reselection to an appropriate cell in a timely manner.

Figure 7:
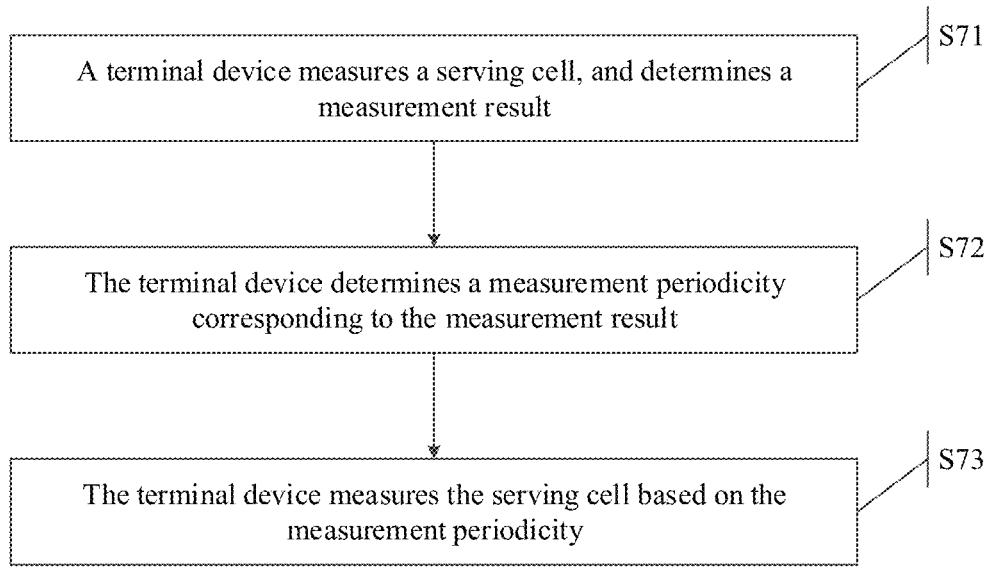
FIG. 7 is a flowchart of a third measurement method according to an embodiment of this application.

To resolve the same technical problem, an embodiment of this application provides a third measurement method. FIG. 7 is a flowchart of the method. The following provides descriptions by using an example in which the method is applied to the network architecture shown in FIG. 3.

For ease of description, the following uses an example in which the method is performed by a network device and a terminal device. For example, this embodiment is applied to the network architecture shown in FIG. 3. Therefore, the network device described below may be the network device in the network architecture shown in FIG. 3, and the terminal device described below may be the terminal device in the network architecture shown in FIG. 3.

S71: the terminal device measures a serving cell, and determines a measurement result. The measurement result may be used to represent received signal strength of the serving cell for the terminal device and/or signal quality of the serving cell.

In this case, the terminal device may be in a relaxed measurement state of the serving cell or a normal measurement state of the serving cell. For the relaxed measurement state of the serving cell and the normal measurement state of the serving cell, refer to the descriptions in the embodiment shown in FIG. 4.

If the terminal device is in the relaxed measurement state of the serving cell, the terminal device is required to continue measuring the serving cell when the terminal device is in the relaxed measurement state of the serving cell. In other words, if it is specified that the terminal device does not measure the serving cell when the terminal device is in the relaxed measurement state of the serving cell, S71 and subsequent steps do not need to be performed.

The measurement result is, for example, one or more of RSRP, RSRQ, or an SINR.

S72: the terminal device determines a measurement periodicity corresponding to the measurement result.

For example, a correspondence between a measurement result and a measurement periodicity may be established in advance. For example, a correspondence between RSRP and a measurement periodicity is established in advance, a correspondence between RSRQ and a measurement periodicity is established in advance, or a correspondence between an SINR and a measurement periodicity is established in advance. The correspondence may be established by the network device, and the network device may send the correspondence to the terminal device. Alternatively, the correspondence may be established by the terminal device, and the terminal device may send the correspondence to the network device after establishing the correspondence. Alternatively, the correspondence may be preconfigured in the terminal device, specified in a protocol, or the like. For example, a larger value of the measurement result indicates a longer length of the corresponding measurement periodicity, or a smaller value of the measurement result indicates a shorter length of the corresponding measurement periodicity. The measurement result may be used to represent the signal quality of the serving cell and/or the received signal strength of the serving cell for the terminal device. For example, better signal quality of the serving cell and/or better received signal strength of the serving cell for the terminal device indicate/indicates a larger value of the measurement result, or poorer signal quality of the serving cell and/or poorer received signal strength of the serving cell for the terminal device indicate/indicates a smaller value of the measurement result. Therefore, it may also be considered that better signal quality of the serving cell and/or better received signal strength of the serving cell for the terminal device indicate/indicates a longer length of the corresponding measurement periodicity, or poorer signal quality of the serving cell and/or poorer received signal strength of the serving cell for the terminal device indicate/indicates a shorter length of the corresponding measurement periodicity.

For more detailed content of S72, refer to S58 in the embodiment shown in FIG. 5.

S73: the terminal device measures the serving cell of the terminal device based on the measurement periodicity.

After determining the corresponding measurement periodicity based on the correspondence between a measurement result and a measurement periodicity and the obtained measurement result, the terminal device may measure the serving cell of the terminal device based on the measurement periodicity. The measurement periodicity is determined based on the measurement result of the terminal device, and conforms to a current state of the terminal device, so that measurement of the serving cell performed by the terminal device can meet a requirement of the terminal device, and energy saving can be implemented as much as possible.

The correspondence between a measurement result and a measurement periodicity may be applied only when the terminal device is in the relaxed measurement state of the serving cell. Certainly, a prerequisite is that frequency on which the terminal device in the relaxed measurement state of the serving cell measures the network device needs to be greater than 0, in other words, the terminal device in the relaxed measurement state of the serving cell needs to continue measuring the serving cell. Alternatively, the correspondence between a measurement result and a measurement periodicity may be applied when the terminal device is in the relaxed measurement state of the serving cell, or may be applied when the terminal device is in the normal measurement state of the serving cell. In this case, it is considered that there is a correspondence between a measurement periodicity and a measurement result. However, for the terminal device, there may be no clear boundary between the relaxed measurement state of the serving cell and the normal measurement state of the serving cell, and the relaxed measurement state of the serving cell and the normal measurement state of the serving cell are merely relative concepts.

In addition, S51 to S56 in the embodiment shown in FIG. 5 may be further performed. For example, S51 to S56 may be performed before S71, or may be performed after S71, or S71 to S73 may be performed before or after any one of S51 to S56. S51 to S56 are only optional steps, and are not necessarily performed.

In embodiments of this application, the correspondence between a measurement result and a measurement periodicity is set. The terminal device may determine the corresponding measurement periodicity based on the measurement result, to measure the serving cell based on the determined measurement periodicity. For example, the measurement result is RSRP, and a larger value of the RSRP may indicate that the terminal device moves toward a center location of the serving cell. In this case, a probability that the terminal device performs cell reselection or handover is low, and therefore the terminal device does not need to excessively measure the serving cell. In this case, a length of the measurement periodicity may gradually increase, so that the terminal device sparsely measures the serving cell, thereby reducing power consumption of the terminal device. A smaller value of the RSRP may indicate that the terminal device moves toward an edge location of the serving cell. In this case, a probability that the terminal device performs cell reselection or handover is high, and the terminal device needs to measure the serving cell. Therefore, a length of the measurement periodicity may gradually decrease, so that the terminal device tends to frequently measure the serving cell, thereby meeting mobility management of the terminal device.

Figure 8:
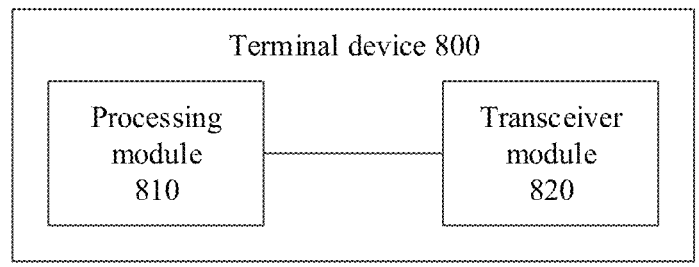
FIG. 8 is a schematic block diagram of a first terminal device according to an embodiment of this application.

FIG. 8 is a schematic block diagram of a communication apparatus 800 according to an embodiment of this application. For example, the communication apparatus 800 is a terminal device 800.

The terminal device 800 includes a processing module 810 and a transceiver module 820. For example, the terminal device 800 may be a terminal device, or may be a chip used in the terminal device or another combined device or a component that has a function of the foregoing terminal device. When the terminal device 800 is a terminal device, the transceiver module 820 may be a transceiver. The transceiver may include an antenna, a radio frequency circuit, and the like. The processing module 810 may be a processor, for example, a baseband processor. The baseband processor may include one or more central processing units (CPUs). When the terminal device 800 is a component having a function of the foregoing terminal device, the transceiver module 820 may be a radio frequency unit, and the processing module 810 may be a processor, for example, a baseband processor. When the terminal device 800 is a chip system, the transceiver module 820 may be an input/output interface of the chip (for example, a baseband chip), and the processing module 810 may be a processor of the chip system, and may include one or more central processing units. It should be understood that, in this embodiment of this application, the processing module 810 may be implemented by a processor or a processor-related circuit component, and the transceiver module 820 may be implemented by a transceiver or a transceiver-related circuit component.

For another example, the processing module 810 may be configured to perform all operations except receiving and sending operations performed by the terminal device in the embodiment shown in FIG. 7, for example, S71, S74, S75, S78, and S79, and/or another process used to support the technology described in this specification. The transceiver module 820 may be configured to perform all receiving and sending operations performed by the terminal device in the embodiment shown in FIG. 7, for example, S72, S73, S76, and S77, and/or another process used to support the technology described in this specification.

In addition, the transceiver module 820 may be a functional module, and the functional module can complete both a sending operation and a receiving operation. For example, the transceiver module 820 may be configured to perform all sending operations and receiving operations performed by the terminal device in the embodiment shown in FIG. 7. For example, when performing the sending operation, the transceiver module 820 may be considered as a sending module, and when performing the receiving operation, the transceiver module 820 may be considered as a receiving module. Alternatively, the transceiver module 820 may be two functional modules. The transceiver module 820 may be considered as a general term of the two functional modules. The two functional modules are a sending module and a receiving module. The sending module is configured to complete a sending operation. For example, the sending module may be configured to perform all sending operations performed by the terminal device in any embodiment of the embodiment shown in FIG. 7. The receiving module is configured to complete a receiving operation. For example, the receiving module may be configured to perform all receiving operations performed by the terminal device in the embodiment shown in FIG. 7.

The processing module 810 is configured to determine that a first measurement reporting condition is met.

The transceiver module 820 is configured to send first information to a network device.

The transceiver module 820 is further configured to receive second information from the network device, where the second information is used to indicate to enter a relaxed measurement state of a serving cell.

In an optional implementation, the first measurement reporting condition includes that a measurement result of the serving cell meets a first threshold within first duration.

In an optional implementation,
  the processing module 810 is further configured to determine that a second measurement reporting condition is met; and
  the transceiver module 820 is further configured to send third information to the network device, where
  the transceiver module 820 is further configured to receive fourth information from the network device, where the fourth information is used to indicate to enter a normal measurement state of the serving cell.

In an optional implementation, the second measurement reporting condition includes that the measurement result of the serving cell meets a second threshold within second duration.

In an optional implementation, the processing module 810 is further configured to determine to enter a normal measurement state of the serving cell after third duration.

In an optional implementation, the second information is further used to indicate the third duration.

For other functions that can be implemented by the terminal device 800, refer to the related descriptions in the embodiment shown in FIG. 7. Details are not described again.

Figure 9:
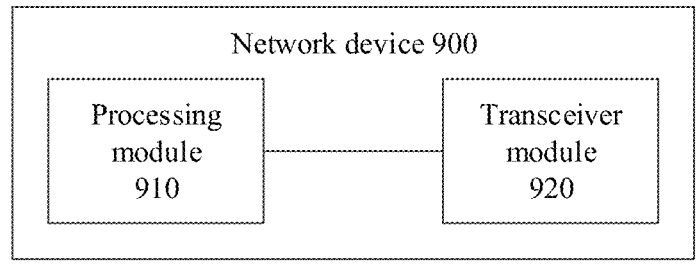
FIG. 9 is a schematic block diagram of a first network device according to an embodiment of this application.

FIG. 9 is a schematic block diagram of a communication apparatus 900 according to an embodiment of this application. For example, the communication apparatus 900 is a network device 900.

The network device 900 includes a processing module 910 and a transceiver module 920. For example, the network device 900 may be a network device, or may be a chip used in the network device or another combined device or a component that has a function of the foregoing network device. When the network device 900 is a network device, the transceiver module 920 may be a transceiver. The transceiver may include an antenna, a radio frequency circuit, and the like. The processing module 910 may be a processor, for example, a baseband processor. The baseband processor may include one or more CPUs. When the network device 900 is a component having a function of the foregoing network device, the transceiver module 920 may be a radio frequency unit, and the processing module 910 may be a processor, for example, a baseband processor. When the network device 900 is a chip system, the transceiver module 920 may be an input/output interface of the chip (for example, a baseband chip), and the processing module 910 may be a processor of the chip system, and may include one or more central processing units. It should be understood that, in this embodiment of this application, the processing module 910 may be implemented by a processor or a processor-related circuit component, and the transceiver module 920 may be implemented by a transceiver or a transceiver-related circuit component.

For example, the processing module 910 may be configured to perform all operations except receiving and sending operations performed by the network device in the embodiment shown in FIG. 7, for example, an operation of determining, based on first information, that the terminal device can enter a relaxed measurement state of a serving cell, and/or another process used to support the technology described in this specification. The transceiver module 920 may be configured to perform all receiving and sending operations performed by the network device in the embodiment shown in FIG. 7, for example, S72, S73, S76, and S77, and/or another process used to support the technology described in this specification.

In addition, for an implementation of the transceiver module 920, refer to the descriptions of the implementation of the transceiver module 820.

The transceiver module 920 is configured to receive the first information from the terminal device, where
the transceiver module 920 is further configured to send second information to the terminal device, where the second information is used to indicate to enter the relaxed measurement state of the serving cell.
Alternatively,
the transceiver module 920 is configured to receive the first information from the terminal device; and
the processing module 910 is configured to determine, based on the first information, that the terminal device can enter the relaxed measurement state of the serving cell, where the transceiver module 920 is further configured to send second information to the terminal device, where the second information is used to indicate to enter the relaxed measurement state of the serving cell.

In an optional implementation, the transceiver module 920 is further configured to:
receive third information from the terminal device; and
send fourth information to the terminal device, where the fourth information is used to indicate to enter a normal measurement state of the serving cell.

In an optional implementation, the second information is further used to indicate third duration, and usage of the third duration is that the terminal device enters a normal measurement state of the serving cell after the third duration.

For other functions that can be implemented by the network device 900, refer to the related descriptions in the embodiment shown in FIG. 7. Details are not described again.

Figure 10:
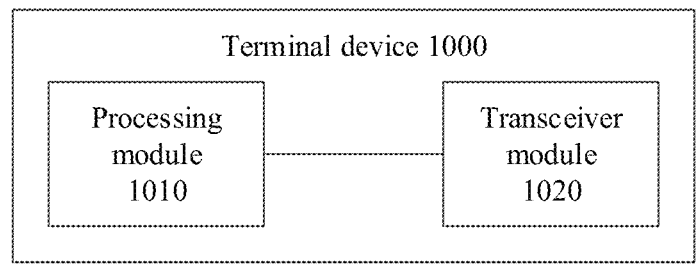
FIG. 10 is a schematic block diagram of a second terminal device according to an embodiment of this application.

FIG. 10 is a schematic block diagram of a communication apparatus 1000 according to an embodiment of this application. For example, the communication apparatus 1000 is a terminal device 1000.

The terminal device 1000 includes a processing module 1010 and a transceiver module 1020. For example, the terminal device 1000 may be a terminal device, or may be a chip used in the terminal device or another combined device or a component that has a function of the foregoing terminal device. When the terminal device 1000 is a terminal device, the transceiver module 1020 may be a transceiver. The transceiver may include an antenna, a radio frequency circuit, and the like. The processing module 1010 may be a processor, for example, a baseband processor. The baseband processor may include one or more CPUs. When the terminal device 1000 is a component having a function of the foregoing terminal device, the transceiver module 1020 may be a radio frequency unit, and the processing module 1010 may be a processor, for example, a baseband processor. When the terminal device 1000 is a chip system, the transceiver module 1020 may be an input/output interface of the chip (for example, a baseband chip), and the processing module 1010 may be a processor of the chip system, and may include one or more central processing units. It should be understood that, in this embodiment of this application, the processing module 1010 may be implemented by a processor or a processor-related circuit component, and the transceiver module 1020 may be implemented by a transceiver or a transceiver-related circuit component.

For example, the processing module 1010 may be configured to perform all operations except receiving and sending operations performed by the terminal device in the embodiment shown in FIG. 4, for example, S43 to S49, and/or another process used to support the technology described in this specification. The transceiver module 1020 may be configured to perform all receiving and sending operations performed by the terminal device in the embodiment shown in FIG. 4, for example, S42, and/or another process used to support the technology described in this specification.

In addition, for an implementation of the transceiver module 1020, refer to the descriptions of the implementation of the transceiver module 820.

The transceiver module 1020 is configured to communicate with another communication apparatus.

The processing module 910 is configured to determine that the communication apparatus is in a relaxed measurement state of a serving cell.

The processing module 910 is further configured to determine, based on a first configuration parameter, that a relaxed measurement condition of a neighboring cell is met, where the first configuration parameter is different from a second configuration parameter, and the second configuration parameter is used to determine the relaxed measurement condition of the neighboring cell when the communication apparatus is in a normal measurement state of the serving cell.

In an optional implementation, the processing module 910 is configured to determine, in the following manner by using the first configuration parameter, whether the relaxed measurement condition of the neighboring cell is met: when the following conditions are met, determining that the relaxed measurement condition of the neighboring cell is met:
- a relaxed monitoring criterion is met within first duration;
- less than fourth duration has passed since measurement for cell reselection is last performed; and
- measurement of the neighboring cell has been performed within at least the first duration after a new cell is selected or reselected, where
- the first configuration parameter includes information about the first duration.

In an optional implementation, the first configuration parameter includes a first threshold, and the first threshold, a reference value, and current quality of the serving cell are used to determine that the relaxed monitoring criterion is met.

In an optional implementation, the processing module 910 is further configured to: measure the serving cell, and determine a measurement result;
- determine a measurement periodicity corresponding to the measurement result; and
- measure the serving cell based on the measurement periodicity.

In an optional implementation,
- better signal quality of the serving cell indicates a longer length of the corresponding measurement periodicity, or poorer signal quality of the serving cell indicates a shorter length of the corresponding measurement periodicity, where the measurement result is used to indicate the signal quality of the serving cell; and/or
- better received signal strength of the serving cell indicates a longer length of the corresponding measurement periodicity, or poorer received signal strength of the serving cell indicates a shorter length of the corresponding measurement periodicity, where the measurement result is used to indicate the received signal strength of the serving cell.

For other functions that can be implemented by the terminal device 1000, refer to the related descriptions in the embodiment shown in FIG. 4. Details are not described again.

Figure 11:
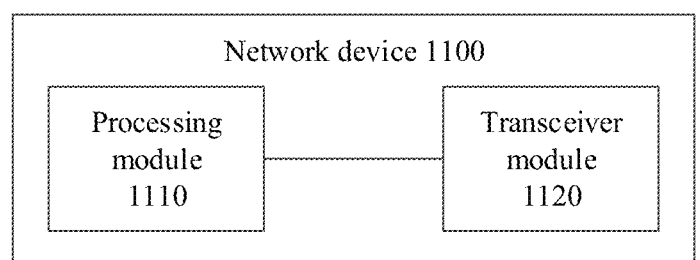
FIG. 11 is a schematic block diagram of a second network device according to an embodiment of this application.

FIG. 11 is a schematic block diagram of a communication apparatus 1100 according to an embodiment of this application. For example, the communication apparatus 1100 is a network device 1100.

The network device 1100 includes a processing module 1110 and a transceiver module 1120. For example, the network device 1100 may be a network device, or may be a chip used in the network device or another combined device or a component that has a function of the foregoing network device. When the network device 1100 is a network device, the transceiver module 1120 may be a transceiver. The transceiver may include an antenna, a radio frequency circuit, and the like. The processing module 1110 may be a processor, for example, a baseband processor. The baseband processor may include one or more CPUs. When the network device 1100 is a component having a function of the foregoing network device, the transceiver module 1120 may be a radio frequency unit, and the processing module 1110 may be a processor, for example, a baseband processor. When the network device 1100 is a chip system, the transceiver module 1120 may be an input/output interface of the chip (for example, a baseband chip), and the processing module 1110 may be a processor of the chip system, and may include one or more central processing units. It should be understood that, in this embodiment of this application, the processing module 1110 may be implemented by a processor or a processor-related circuit component, and the transceiver module 1120 may be implemented by a transceiver or a transceiver-related circuit component.

For example, the processing module 1110 may be configured to perform all operations except receiving and sending operations performed by the network device in the embodiment shown in FIG. 4, for example, S41, and/or another process used to support the technology described in this specification. The transceiver module 1120 may be configured to perform all receiving and sending operations performed by the network device in the embodiment shown in FIG. 4, for example, S91, S93, and S42, and/or another process used to support the technology described in this specification.

In addition, for an implementation of the transceiver module 1120, refer to the descriptions of the implementation of the transceiver module 820.

The processing module 1110 is configured to determine a first configuration parameter and a second configuration parameter, where the first configuration parameter is used to determine a relaxed measurement condition of a neighboring cell when the communication apparatus is in a relaxed measurement state of a serving cell, the second configuration parameter is used to determine the relaxed measurement condition of the neighboring cell when the communication apparatus is in a normal measurement state of the serving cell, and the first configuration parameter is different from the second configuration parameter.

The transceiver module 1120 is configured to send the first configuration parameter and the second configuration parameter to a terminal device.

For other functions that can be implemented by the network device 1100, refer to the related descriptions in the embodiment shown in FIG. 4. Details are not described again.

Figure 12:
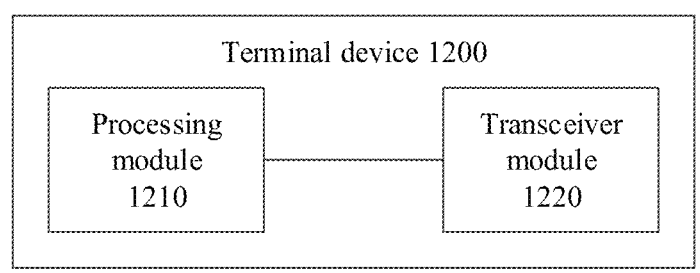
FIG. 12 is a schematic block diagram of a third terminal device according to an embodiment of this application.

FIG. 12 is a schematic block diagram of a communication apparatus 1200 according to an embodiment of this application. For example, the communication apparatus 1200 is a terminal device 1200.

The terminal device 1200 includes a processing module 1210 and a transceiver module 1220. For example, the terminal device 1200 may be a terminal device, or may be a chip used in the terminal device or another combined device or a component that has a function of the foregoing terminal device. When the terminal device 1200 is a terminal device, the transceiver module 1220 may be a transceiver. The transceiver may include an antenna, a radio frequency circuit, and the like. The processing module 1210 may be a processor, for example, a baseband processor. The baseband processor may include one or more CPUs. When the terminal device 1200 is a component having a function of the foregoing terminal device, the transceiver module 1220 may be a radio frequency unit, and the processing module 1210 may be a processor, for example, a baseband processor. When the terminal device 1200 is a chip system, the transceiver module 1220 may be an input/output interface of the chip (for example, a baseband chip), and the processing module 1210 may be a processor of the chip system, and may include one or more central processing units. It should be understood that, in this embodiment of this application, the processing module 1210 may be implemented by a processor or a processor-related circuit component, and the transceiver module 1220 may be implemented by a transceiver or a transceiver-related circuit component.

For example, the processing module 1210 may be configured to perform all operations except receiving and sending operations performed by the terminal device in the embodiment shown in FIG. 6, for example, S61 to S63, and/or another process used to support the technology described in this specification. The transceiver module 1220 may be configured to perform all receiving and sending operations performed by the terminal device in the embodiment shown in FIG. 6, for example, an operation of receiving a reference signal from a serving device (to enable the processing module 1210 to measure a serving cell), and/or another process used to support the technology described in this specification.

In addition, for an implementation of the transceiver module 1220, refer to the descriptions of the implementation of the transceiver module 1520.

The transceiver module 1220 is configured to communicate with another communication apparatus.

The processing module 1210 is configured to: measure the serving cell, and determine a measurement result.

The processing module 1210 is further configured to determine a measurement periodicity corresponding to the measurement result.

The processing module 1210 is further configured to measure the serving cell based on the measurement periodicity.

In an optional implementation,
better signal quality of the serving cell indicates a longer length of the corresponding measurement periodicity, or poorer signal quality of the serving cell indicates a shorter length of the corresponding measurement periodicity, where the measurement result is used to indicate the signal quality of the serving cell; and/or
better received signal strength of the serving cell indicates a longer length of the corresponding measurement periodicity, or poorer received signal strength of the serving cell indicates a shorter length of the corresponding measurement periodicity, where the measurement result is used to indicate the received signal strength of the serving cell.

For other functions that can be implemented by the terminal device 1200, refer to the related descriptions in the embodiment shown in FIG. 6. Details are not described again.

An embodiment of this application further provides a communication apparatus. The communication apparatus may be a terminal device or a circuit. The communication apparatus may be configured to perform actions performed by the terminal device in the foregoing method embodiments.

Figure 13:
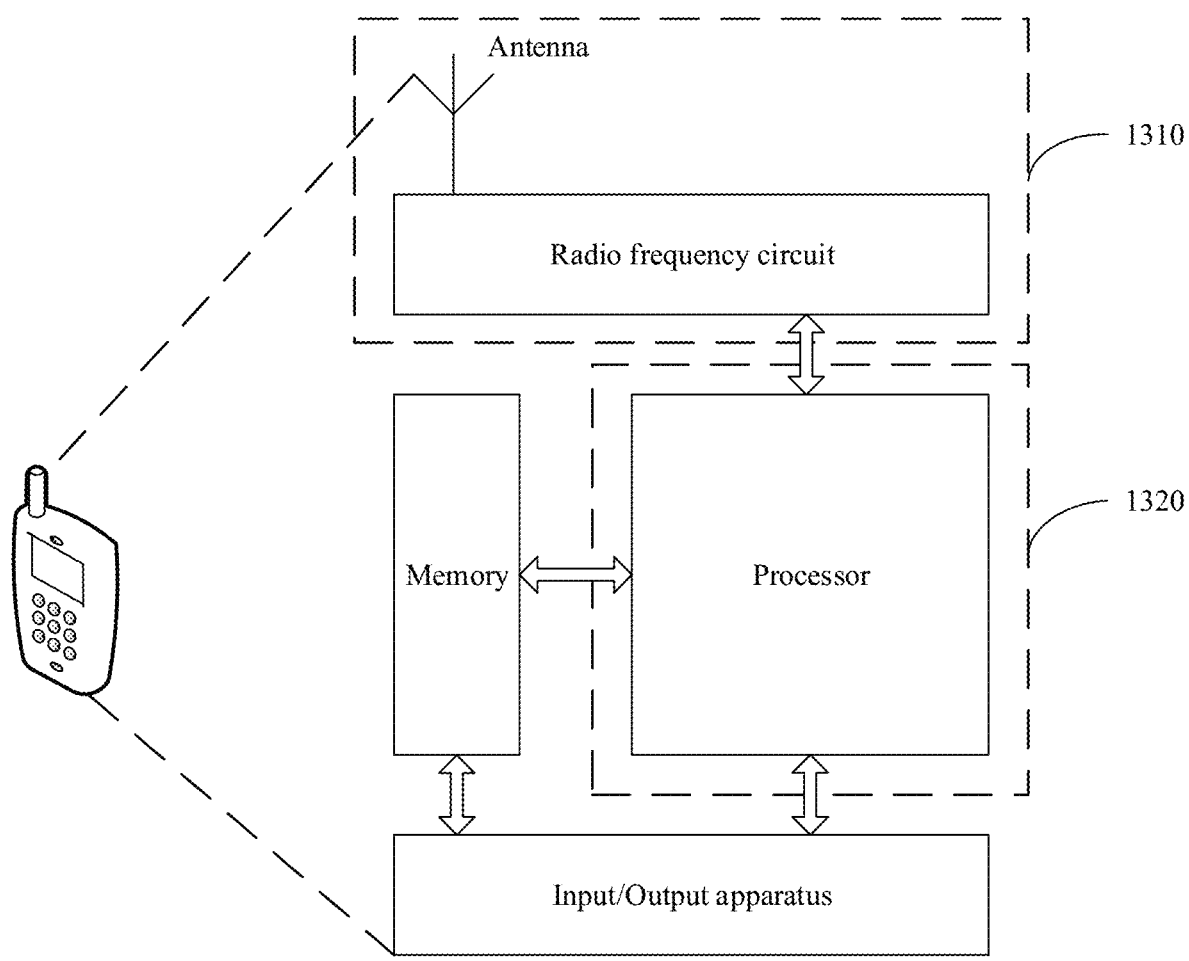
FIG. 13 is a schematic block diagram of a communication apparatus according to an embodiment of this application.

Optionally, when the communication apparatus is a terminal device, FIG. 13 is a simplified schematic diagram of a structure of a terminal device. For ease of understanding and illustration, in FIG. 13, a mobile phone is used as an example of the terminal device. As shown in FIG. 13, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to: receive data entered by a user, and output data to the user. It should be noted that some types of terminal devices may not have the input/output apparatus.

When needing to send data, after performing baseband processing on the to-be-sent data, the processor outputs a baseband signal to the radio frequency circuit, and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 13. In an actual terminal device product, there may be one or more processors and one or more memories. The memory may also be referred to as a storage medium, a storage device, or the like. The memory may be independent of the processor, or may be integrated with the processor. This is not limited in embodiments of this application.

In embodiments of this application, the antenna and the radio frequency circuit that have receiving and sending functions may be considered as a transceiver unit of the terminal device (where the transceiver unit may be a functional unit, and the functional unit can implement a sending function and a receiving function; or the transceiver unit may include two functional units: a receiving unit that can implement a receiving function and a sending unit that can implement a sending function), and a processor that has a processing function is considered as a processing unit of the terminal device. As shown in FIG. 13, the terminal device includes a transceiver unit 1310 and a processing unit 1320. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1310 and that is configured to implement a receiving function may be considered as a receiving unit, and a component that is in the transceiver unit 1310 and that is configured to implement a sending function may be considered as a sending unit. That is, the transceiver unit 1310 includes the receiving unit and the sending unit. Sometimes, the transceiver unit may also be referred to as a transceiver machine, a transceiver, a transceiver circuit, or the like. Sometimes, the receiving unit may also be referred to as a receiver machine, a receiver, a receiver circuit, or the like. Sometimes, the sending unit may also be referred to as a transmitter machine, a transmitter, a transmitter circuit, or the like.

It should be understood that the transceiver unit 1310 is configured to perform a sending operation and a receiving operation on a terminal device side in the foregoing method embodiments, and the processing unit 1320 is configured to perform an operation other than the receiving and sending operations of the terminal device in the foregoing method embodiments.

For example, in an implementation, the processing unit 1320 may be configured to perform all operations except receiving and sending operations performed by the terminal device in the embodiment shown in FIG. 7, for example, S71, S74, S75, S78, and S79, and/or another process used to support the technology described in this specification. The transceiver unit 1310 may be configured to perform all receiving and sending operations performed by the terminal device in the embodiment shown in FIG. 7, for example, S72, S73, S76, and S77, and/or another process used to support the technology described in this specification.

For example, in an implementation, the processing unit 1320 may be configured to perform all operations except receiving and sending operations performed by the terminal device in the embodiment shown in FIG. 4, for example, S43 to S49, and/or another process used to support the technology described in this specification. The transceiver unit 1310 may be configured to perform all receiving and sending operations performed by the terminal device in the embodiment shown in FIG. 4, for example, S42, and/or another process used to support the technology described in this specification.

For another example, in an implementation, the processing unit 1320 may be configured to perform all operations except receiving and sending operations performed by the terminal device in the embodiment shown in FIG. 6, for example, S61 to S63, and/or another process used to support the technology described in this specification. The transceiver unit 1310 may be configured to perform all receiving and sending operations performed by the terminal device in the embodiment shown in FIG. 6, for example, an operation of receiving a reference signal from a serving device (to enable the processing module 1210 to measure a serving cell), and/or another process used to support the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 14:
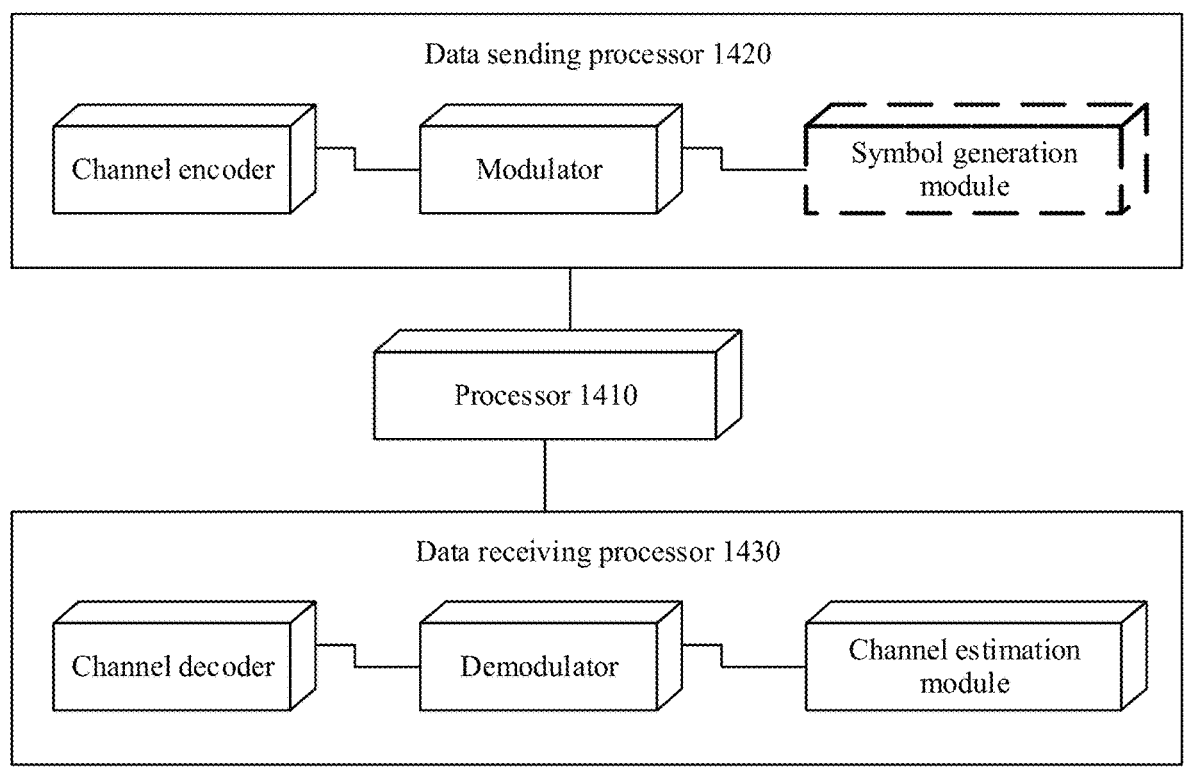
FIG. 14 is another schematic block diagram of a communication apparatus according to an embodiment of this application.

When the communication apparatus in this embodiment is a terminal device, refer to the device shown in FIG. 14. In an example, the device may implement a function similar to that of the processing module 810 in FIG. 8. In another example, the device may implement a function similar to that of the processing module 1010 in FIG. 10. In still another example, the device may implement a function similar to that of the processing module 1210 in FIG. 12. In FIG. 14, the device includes a processor 1410, a data sending processor 1420, and a data receiving processor 1430. The processing module 810 in the foregoing embodiment may be the processor 1410 in FIG. 14, and implement a corresponding function. The transceiver module 820 in the foregoing embodiment may be the data sending processor 1420 and/or the data receiving processor 1430 in FIG. 14, and implement a corresponding function. Alternatively, the processing module 1010 in the foregoing embodiment may be the processor 1410 in FIG. 14, and implement a corresponding function. The transceiver module 1020 in the foregoing embodiment may be the data sending processor 1420 and/or the data receiving processor 1430 in FIG. 14, and implement a corresponding function. Alternatively, the processing module 1210 in the foregoing embodiment may be the processor 1410 in FIG. 14, and implement a corresponding function. The transceiver module 1220 in the foregoing embodiment may be the data sending processor 1420 and/or the data receiving processor 1430 in FIG. 14, and implement a corresponding function. Although FIG. 14 shows a channel encoder and a channel decoder, it may be understood that the modules do not constitute a limitation on this embodiment, but are merely examples.

Figure 15:
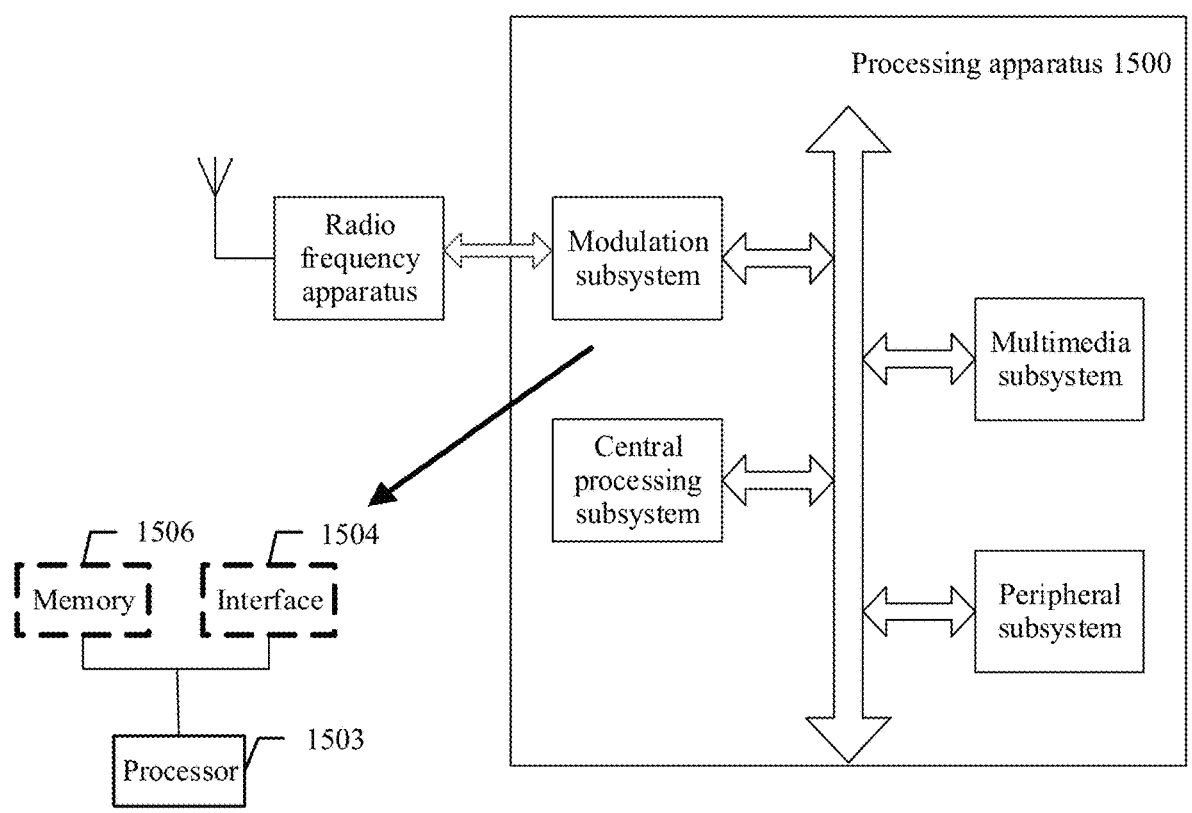
FIG. 15 is still another schematic block diagram of a communication apparatus according to an embodiment of this application.

FIG. 15 shows another form of this embodiment. A processing apparatus 1500 includes modules such as a modulation subsystem, a central processing subsystem, and a peripheral subsystem. A communication apparatus in this embodiment may be used as the modulation subsystem. Specifically, the modulation subsystem may include a processor 1503 and an interface 1504. The processor 1503 completes a function of the foregoing processing module 810, and the interface 1504 completes a function of the foregoing transceiver module 820. Alternatively, the processor 1503 completes a function of the processing module 1010, and the interface 1504 completes a function of the transceiver module 1020. Alternatively, the processor 1503 completes a function of the processing module 1210, and the interface 1504 completes a function of the transceiver module 1220. In another variation, the modulation subsystem includes a memory 1506, a processor 1503, and a program that is stored in the memory 1506 and that can be run on the processor. When executing the program, the processor 1503 implements the methods on a terminal device side in the foregoing method embodiments. It should be noted that the memory 1506 may be nonvolatile or volatile. The memory 1506 may be located in the modulation subsystem, or may be located in the processing apparatus 1500, provided that the memory 1506 can be connected to the processor 1503.

Figure 16:
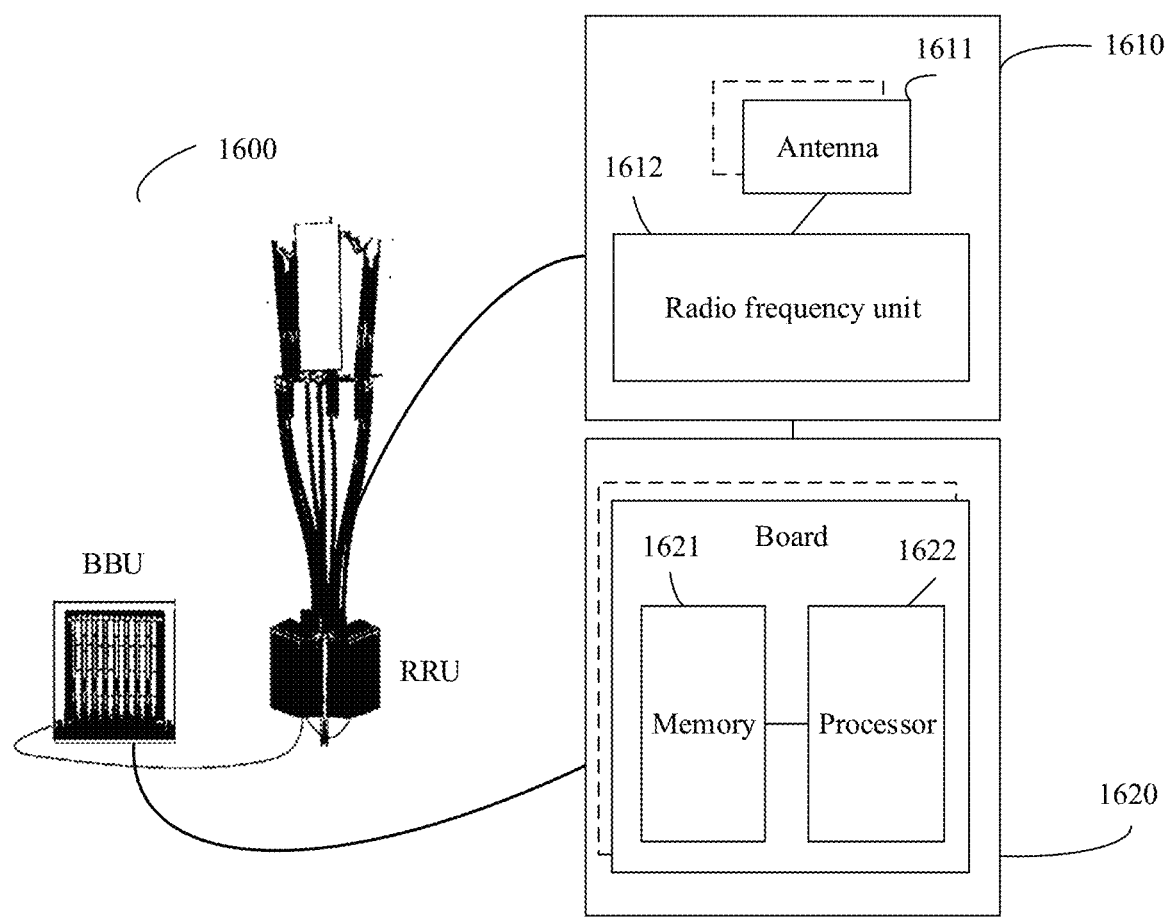
FIG. 16 is yet another schematic block diagram of a communication apparatus according to an embodiment of this application.

When the apparatus in embodiments of this application is a network device, the apparatus may be shown in FIG. 16. The apparatus 1600 includes one or more radio frequency units, such as a remote radio unit (RRU) 1610 and one or more baseband units (BBUs) (which may also be referred to as a digital unit (DU)) 1620. The RRU 1610 may be referred to as a transceiver module. The transceiver module may include a sending module and a receiving module, or the transceiver module may be a module that can implement sending and receiving functions. The transceiver module may correspond to the transceiver module 920 in FIG. 9. Alternatively, the transceiver module may correspond to the transceiver module 1120 in FIG. 11. Optionally, the transceiver module may also be referred to as a transceiver machine, a transceiver circuit, a transceiver, or the like, and may include at least one antenna 1611 and a radio frequency unit 1612. The RRU 1610 is mainly configured to: receive and send a radio frequency signal, and perform conversion between a radio frequency signal and a baseband signal. For example, the RRU 1610 is configured to send indication information to a terminal device. The BBU 1610 is mainly configured to: perform baseband processing, control a base station, and the like. The RRU 1610 and the BBU 1620 may be physically disposed together, or may be physically disposed separately, that is, in a distributed base station.

The BBU 1620 is a control center of the base station, may also be referred to as a processing module, may correspond to the processing module 910 in FIG. 9, or may correspond to the processing module 1110 in FIG. 11, and is mainly configured to complete a baseband processing function, such as channel coding, multiplexing, modulation, and spectrum spreading. For example, the BBU (processing module) may be configured to control the base station to perform an operation procedure related to the network device in the foregoing method embodiments, for example, generate the indication information.

In an example, the BBU 1620 may include one or more boards, and a plurality of boards may jointly support a radio access network (for example, an LTE network) in a single access standard, or may separately support radio access networks (for example, an LTE network, a 5G network, or another network) in different access standards. The BBU 1620 further includes a memory 1621 and a processor 1622. The memory 1621 is configured to store necessary instructions and data. The processor 1622 is configured to control the base station to perform a necessary action, for example, configured to control the base station to perform the operation procedure related to the network device in the foregoing method embodiments. The memory 1621 and the processor 1622 may serve the one or more boards. In other words, a memory and a processor may be disposed on each board. Alternatively, a plurality of boards may share a same memory and a same processor. In addition, a necessary circuit may be further disposed on each board.

An embodiment of this application provides a first communication system. The first communication system may include the terminal device in the embodiment shown in FIG. 7 and the network device in the embodiment shown in FIG. 7. For example, the terminal device is the terminal device 800 in FIG. 8. For example, the network device is the network device 900 in FIG. 9.

An embodiment of this application provides a second communication system. The second communication system may include the terminal device in the embodiment shown in FIG. 4 and the network device in the embodiment shown in FIG. 4. For example, the terminal device is the terminal device 1000 in FIG. 10. For example, the network device is the network device 1100 in FIG. 11.

An embodiment of this application provides a third communication system. The third communication system may include the terminal device in the embodiment shown in FIG. 6. Optionally, the third communication system may further include the network device in the embodiment shown in FIG. 6. For example, the terminal device is the terminal device 1200 in FIG. 12.

An embodiment of this application further provides a computer-readable storage medium. The computer-readable storage medium stores a computer program. When the computer program is executed by a computer, the computer may implement a procedure related to a network device in the embodiment shown in FIG. 7 provided in the foregoing method embodiment.

An embodiment of this application further provides a computer-readable storage medium. The computer-readable storage medium is configured to store a computer program. When the computer program is executed by a computer, the computer may implement a procedure related to a terminal device in the embodiment shown in FIG. 7 provided in the foregoing method embodiment.

An embodiment of this application further provides a computer-readable storage medium. The computer-readable storage medium stores a computer program. When the computer program is executed by a computer, the computer may implement a procedure related to a network device in the embodiment shown in FIG. 4 provided in the foregoing method embodiment.

An embodiment of this application further provides a computer-readable storage medium. The computer-readable storage medium is configured to store a computer program. When the computer program is executed by a computer, the computer may implement a procedure related to a terminal device in the embodiment shown in FIG. 4 provided in the foregoing method embodiment.

An embodiment of this application further provides a computer-readable storage medium. The computer-readable storage medium stores a computer program. When the computer program is executed by a computer, the computer may implement a procedure related to a terminal device in the embodiment shown in FIG. 6 provided in the foregoing method embodiment.

An embodiment of this application further provides a computer program product. The computer program product is configured to store a computer program. When the computer program is executed by a computer, the computer may implement a procedure related to a network device in the embodiment shown in FIG. 7 provided in the foregoing method embodiment.

An embodiment of this application further provides a computer program product. The computer program product is configured to store a computer program. When the computer program is executed by a computer, the computer may implement a procedure related to a terminal device in the embodiment shown in FIG. 7 provided in the foregoing method embodiment.

An embodiment of this application further provides a computer program product. The computer program product is configured to store a computer program. When the computer program is executed by a computer, the computer may implement a procedure related to a network device in the embodiment shown in FIG. 4 provided in the foregoing method embodiment.

An embodiment of this application further provides a computer program product. The computer program product is configured to store a computer program. When the computer program is executed by a computer, the computer may implement a procedure related to a terminal device in the embodiment shown in FIG. 4 provided in the foregoing method embodiment.

An embodiment of this application further provides a computer program product. The computer program product is configured to store a computer program. When the computer program is executed by a computer, the computer may implement a procedure related to a terminal device in the embodiment shown in FIG. 6 provided in the foregoing method embodiment.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should also be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external high-speed cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general-purpose processor, a DSP, an ASIC, an FPGA or another programmable logic device, a discrete gate or a transistor logic device, or a discrete hardware component, the memory (the storage module) is integrated into the processor.

It should be noted that the memory described in this specification is intended to include but not limited to these memories and any memory of another appropriate type.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatuses, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate parts may or may not be physically separate. Parts displayed as units may or may not be physical units, and may be located in one position or may be distributed on a plurality of network units. Some or all of the units may be selected based on actual requirements to achieve the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing computer-readable storage medium may be any usable medium accessible by a computer. The computer-readable medium may include, for example but not limited to, a random access memory (RAM), a read-only memory (ROM), an electrically erasable programmable read-only memory (EEPROM), a compact disc read-only memory (CD-ROM), a universal serial bus flash disk, a removable hard disk or another compact disc storage, a magnetic disk storage medium or another magnetic storage device, or any other medium that can be used to carry or store expected program code in a form of an instruction or a data structure and that can be accessed by a computer.

The foregoing descriptions are merely exemplary implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A measurement method, applied to a terminal device comprising one or more processors configured to perform the method, wherein the method comprises:
   determining that a first measurement reporting condition is met, wherein the first measurement reporting condition comprises that a measurement result of a serving cell meets a first threshold within a first duration;
   sending first information to a network device;
   receiving second information from the network device, wherein the second information indicates to enter a relaxed measurement state of the serving cell; and
   subsequent to entering the relaxed measurement state, determining a measuring periodicity for obtaining measurement results from the serving cell based on the measurement result of the serving cell.

2. The method according to claim 1, wherein the method further comprises:
   determining that a second measurement reporting condition is met;
   sending third information to the network device; and
   receiving fourth information from the network device, wherein the fourth information indicates to enter a normal measurement state of the serving cell.

3. The method according to claim 2, wherein the second measurement reporting condition comprises that the measurement result of the serving cell meets a second threshold within a second duration.

4. The method according to claim 1, wherein the method further comprises:
   determining to enter a normal measurement state of the serving cell after a third duration.

5. The method according to claim 4, wherein the second information further indicates the third duration.

6. A measurement method, applied to a network device comprising one or more processors configured to perform the method, wherein the method comprises:
- receiving first information from a terminal device, wherein the first information includes that a first measurement reporting condition is met, wherein the first measurement reporting condition comprises that a measurement result of a serving cell meets a first threshold within a first duration; and
- sending second information to the terminal device, wherein the second information indicates to enter a relaxed measurement state of the serving cell, wherein subsequent to entering the relaxed measurement state the terminal device is configured to determine a measuring periodicity for obtaining measurement results from the serving cell based on the measurement result of the serving cell.

7. The method according to claim 6, wherein the method further comprises:
- receiving third information from the terminal device; and
- sending fourth information to the terminal device, wherein the fourth information indicates to enter a normal measurement state of the serving cell.

8. The method according to claim 6, wherein the second information further indicates a third duration for the terminal device to determine to enter a normal measurement state of the serving cell after the third duration.

9. An apparatus, comprising:
- one or more processors; and
- one or more memories coupled to the one or more processors and storing programming instructions for an execution by the one or more processors to cause the apparatus to perform a method comprising:
- determining that a first measurement reporting condition is met, wherein the first measurement reporting condition comprises that a measurement result of a serving cell meets a first threshold within a first duration;
- sending first information to a network device;
- receiving second information from the network device, wherein the second information indicates to enter a relaxed measurement state of a serving cell; and
- subsequent to entering the relaxed measurement state, determining a measuring periodicity for obtaining measurement results from the serving cell based on the measurement result of the serving cell.

10. The apparatus according to claim 9, wherein the method further comprises:
- determining that a second measurement reporting condition is met;
- sending third information to the network device; and
- receiving fourth information from the network device, wherein the fourth information indicates to enter a normal measurement state of the serving cell.

11. The apparatus according to claim 10, wherein the second measurement reporting condition comprises that the measurement result of the serving cell meets a second threshold within a second duration.

12. The apparatus according to claim 9, wherein the method further comprises:
- determining to enter a normal measurement state of the serving cell after a third duration.

13. The apparatus according to claim 12, wherein the second information further indicates the third duration.

14. The method according to claim 1, wherein the measurement result comprises a reference signal received power, reference signal received quality, or a signal to interference plus noise ratio.

* * * * *